(12) United States Patent
Crimmins et al.

(10) Patent No.: US 6,184,641 B1
(45) Date of Patent: Feb. 6, 2001

(54) CONTROLLER FOR A DOOR OPERATOR

(75) Inventors: Terence E. Crimmins, Northport, NY (US); William G. Gioia, Winfield, IL (US)

(73) Assignee: The Chamberlain Group, Inc., Elmhurst, IL (US)

(*) Notice: Under 35 U.S.C. 154(b), the term of this patent shall be extended for 0 days.

(21) Appl. No.: 09/526,969

(22) Filed: Mar. 16, 2000

Related U.S. Application Data

(63) Continuation of application No. 09/063,832, filed on Apr. 21, 1998, now abandoned.

(51) Int. Cl.$^7$ .................................................. H02P 7/00
(52) U.S. Cl. ........................ 318/466; 318/266; 318/286; 318/445
(58) Field of Search .................. 318/245, 254, 318/430–449, 16, 778, 785, 786, 789, 782, 795, 626, 590, 561, 280, 466, 467, 468, 791, 753, 793, 282, 267, 445; 340/825.22, 825.31, 825.34, 825.69; 187/133, 101, 130; 49/25, 31, 14, 28, 264, 199

(56) References Cited

U.S. PATENT DOCUMENTS

| | | | |
|---|---|---|---|
| 3,993,940 | 11/1976 | Volk, Jr. | 318/207 B |
| 4,006,392 | 2/1977 | Catlett et al. | 318/266 |
| 4,134,050 | 1/1979 | Sibalis | 318/267 |
| 4,234,833 | 11/1980 | Barrett | 318/282 |
| 4,274,227 | 6/1981 | Teonjes | 49/25 |
| 4,353,022 | 10/1982 | Young | 318/753 |
| 4,369,399 | 1/1983 | Lee et al. | 318/467 |
| 4,386,398 | 5/1983 | Matsouka et al. | 364/167 |
| 4,399,394 | 8/1983 | Ballman | 318/786 |
| 4,565,029 | 1/1986 | Kornbrekke et al. | 49/25 |
| 4,583,081 | 4/1986 | Schmitz | 340/545 |
| 4,669,218 | 6/1987 | Kornbrekke et al. | 49/25 |
| 4,687,982 | 8/1987 | Palaniappan | 318/763 |
| 4,698,937 | 10/1987 | Kornbrekke et al. | 49/25 |

(List continued on next page.)

FOREIGN PATENT DOCUMENTS

| | | |
|---|---|---|
| 995852 | 6/1965 | (GB). |
| 1427435 | 3/1976 | (GB). |
| 2219701 | 12/1989 | (GB). |

OTHER PUBLICATIONS

Owener'Manual, Model T, Industrial Duty Door Operator, The Chamberlain Group, 1998.

Owner's Manual, Model T, Solid State, Industrial Duty Door Operator, The Chamberlain Group, Inc. 1979.

*Primary Examiner*—Paul Ip
(74) *Attorney, Agent, or Firm*—Fitch, Even, Tabin & Flannery

(57) ABSTRACT

A controller for controlling a motor and other functions in a commercial door or barrier operator is described. The controller includes a unique motor start circuit for starting an AC motor which employs two dual-pole-dual-throw (DPDT) relays for activating the start coil in combination with a single triac for activating the main coil of the motor, eliminating dv/dt sensitivity. A motor start control for a door or barrier operator includes a speed governor integrated onto the controller for detecting when to shut off AC power to the start coil in a single phase motor. The integrated speed governor uses an RPM sensor for detecting the speed of the operator's limit shaft coupled to software run by the processor. Switches for operating open, close, stop and learn functions are located on the controller to facilitate installation, maintenance and programming by a service provider at the door operator. In addition, a cycle counter provides a warning when the number of barrier movements equals a predetermined, programmable number of movements.

49 Claims, 19 Drawing Sheets

U.S. PATENT DOCUMENTS

| | | | |
|---|---|---|---|
| 4,724,505 | 2/1988 | Gelbort | 361/167 |
| 4,820,964 | 4/1989 | Kadah et al. | 318/786 |
| 4,862,053 | 8/1989 | Jordan et al. | 318/786 |
| 4,930,604 | 6/1990 | Schienda et al. | 187/133 |
| 4,939,433 | 7/1990 | Ballyns et al. | 318/280 |
| 5,278,480 | 1/1994 | Murray | 318/626 |
| 5,325,034 | 6/1994 | Reynolds | 318/782 |
| 5,512,809 | 4/1996 | Banks et al. | 318/778 |
| 5,751,224 | 5/1998 | Fitzgibbon | 340/825.22 |
| 5,780,987 * | 7/1998 | Fitzgibbon et al. | 318/466 |
| 5,925,996 * | 7/1999 | Murray | 318/471 |
| 6,097,166 * | 8/2000 | Fitzgibbon et al. | 318/471 |
| 6,107,765 * | 8/2000 | Fitzgibbon et al. | 318/266 |

* cited by examiner

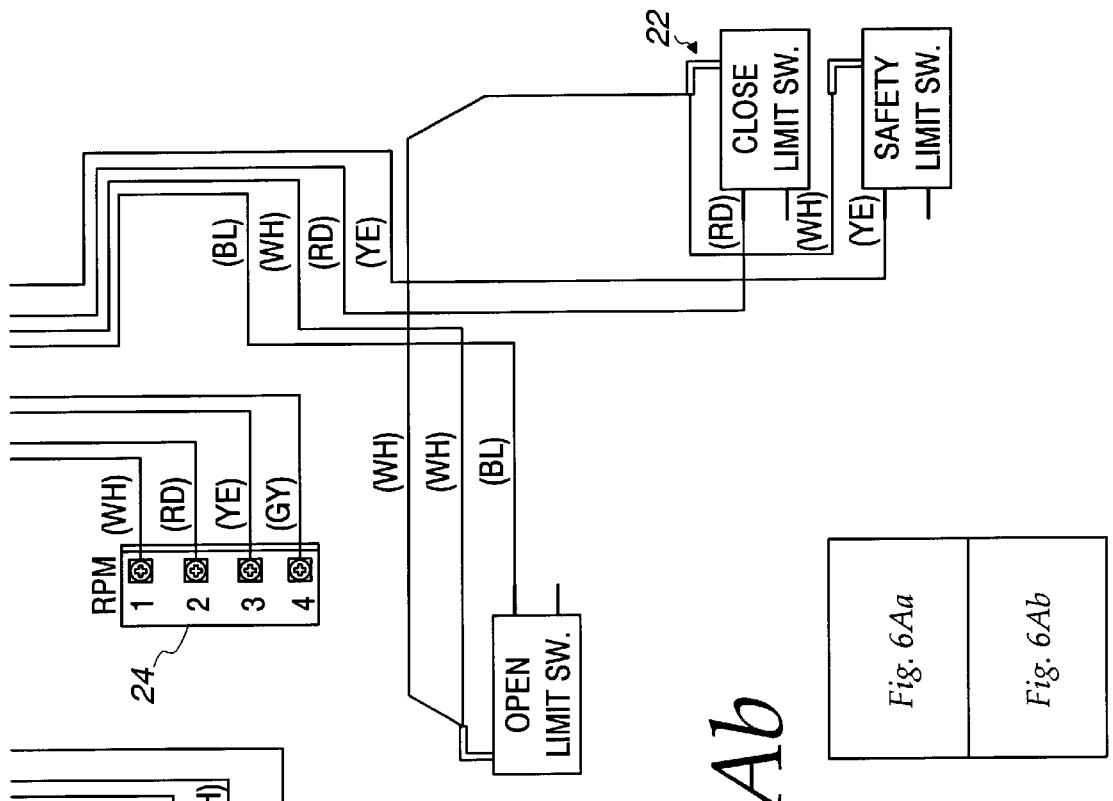
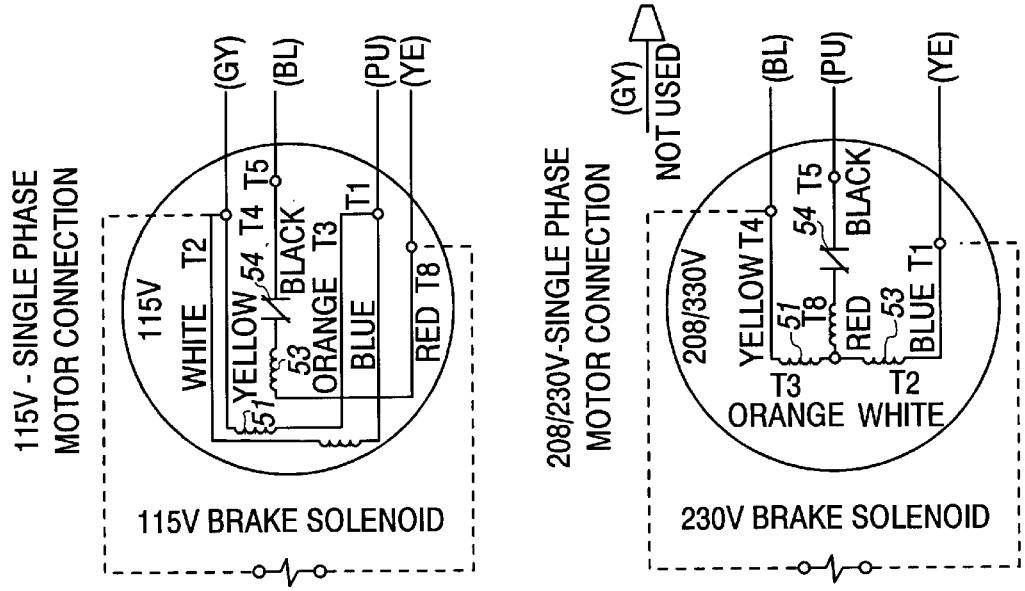
Fig. 6Ab

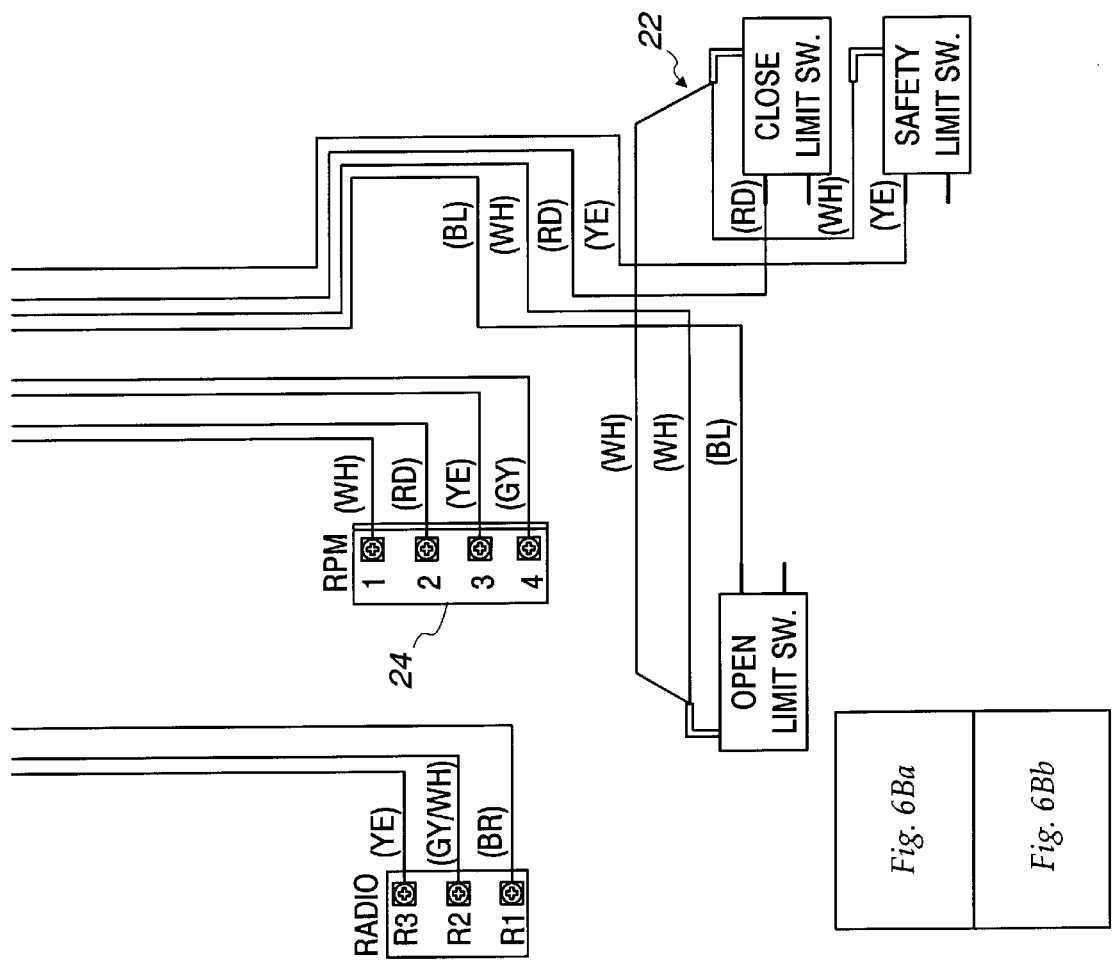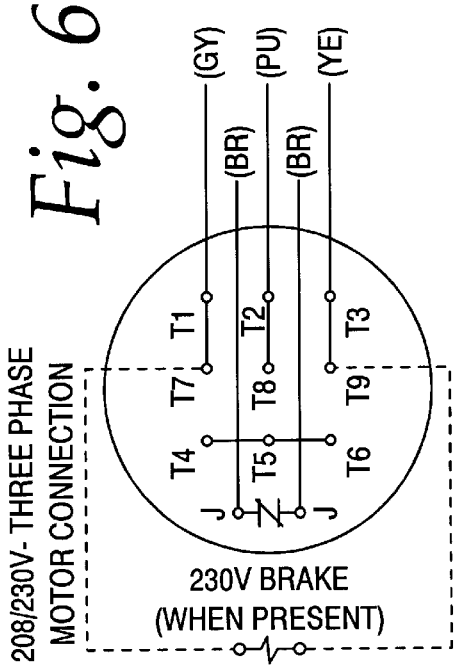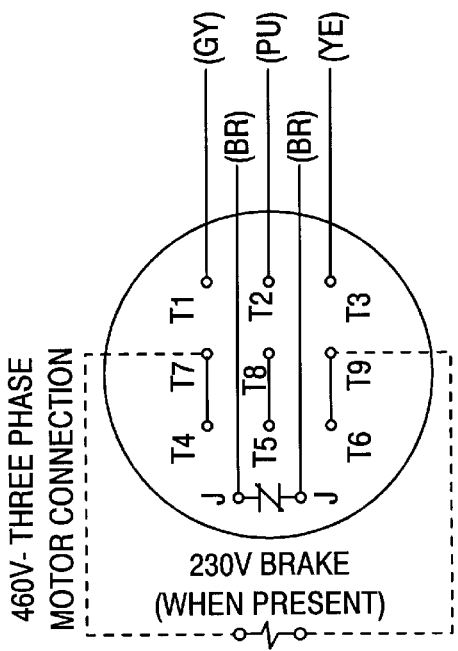

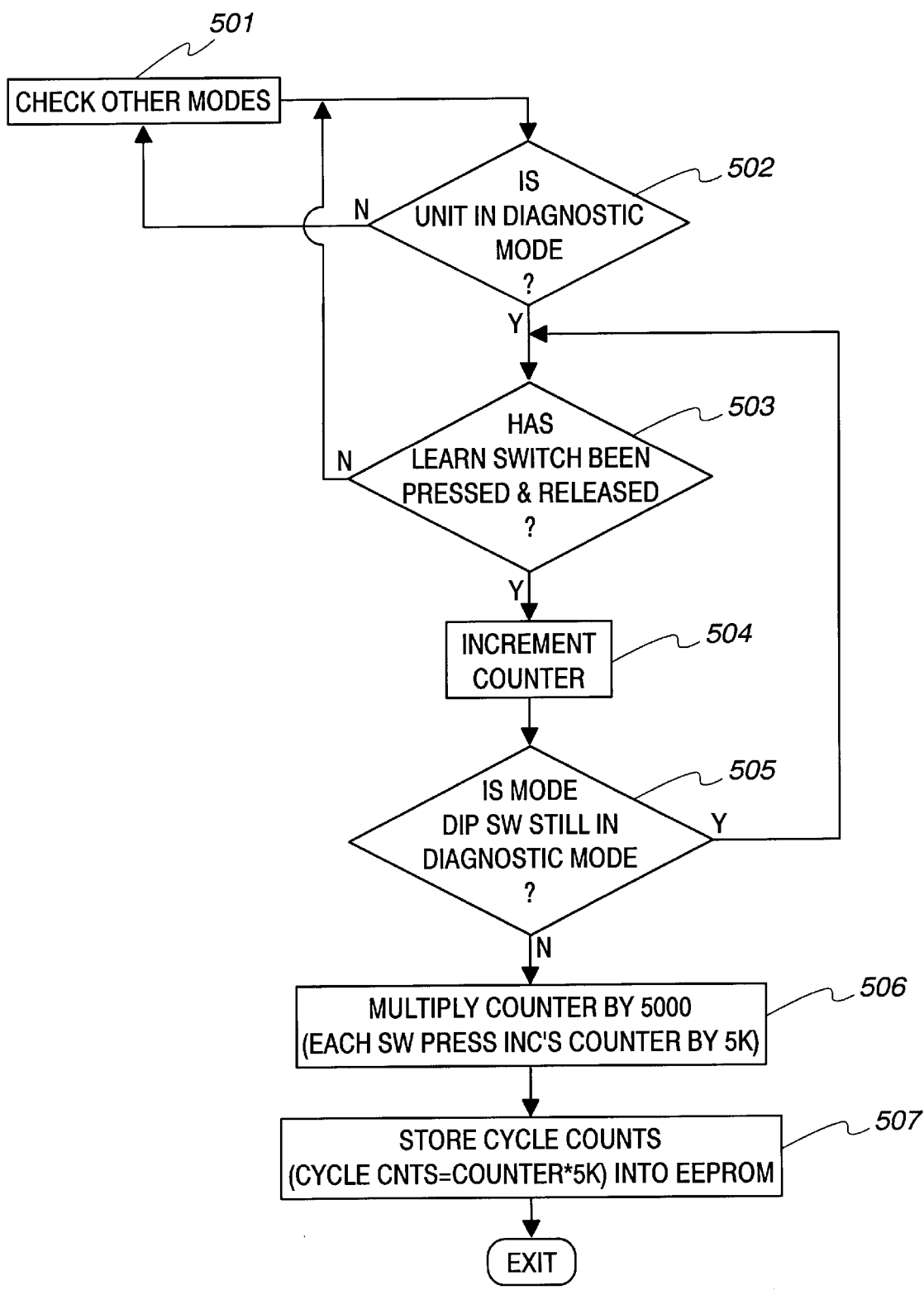
Fig. 8  CYCLE COUNTER LEARN MODE

CONTROLLER FOR A DOOR OPERATOR

This is a continuation, of prior application number U.S. Ser. No. 09/063,832, filed Apr. 21, 1998, now abandoned which is hereby incorporated herein by reference in its entirety.

BACKGROUND OF THE INVENTION

This invention relates to a controller for controlling a commercial door operator or barrier operator, and more particularly to a controller for controlling the motor, interface, safety systems and other functions of a commercial door or barrier operator.

Commercial door operators, depending on the voltage requirements necessitated by the size and weight of the door or barrier to be moved, use single phase and three phase induction motors to move the door. Some door operator applications require use of a DC motor, which is somewhat easier to start. Creating enough starting torque and being able to select the direction of rotation of an induction motor is an important function of a door operator.

In a single phase induction motor, the rotor is of the squirrel cage type. The stator has a main winding which produces a pulsating field. At standstill, the pulsating field cannot produce rotor currents that will act on the air-gap flux to produce rotor torque. However, once the rotor is turning, it produces a cross flux at right angles with the main field and produces a rotating field comparable to that produced by the stator of a two-phase motor.

To start a single phase motor, a starting coil is used. In a capacitive motor, the starting winding is connected to the supply through a capacitor. This results in the starting winding current leading the applied voltage. The motor then has winding currents at standstill that are nearly 90 degrees apart in time and space, thus producing high starting torque and high power factor.

A three phase motor has three coils, so applying current to each coil always produces a current which leads the applied voltage, resulting in sufficient starting torque to start the motor.

Traditionally, because of the high current required for operating the motor used to drive a commercial door, commercial door operators employed an electromechanical control package. The electromechanical control package typically used relays for logic functions and contactors for motor control. Contactors are essentially relays that can switch large currents. While electromechanical control packages are considered reliable in the field and cost effective, they have limited versatility. Their logic functions are hard wired at the factory and not field programmable, so customers cannot change the configuration of their door operators after acquiring them. Also, electromechanical control packages do not readily accommodate additional features, although additional features, such as delay on reverse and start coil control can be provided via costly add-on modules. Other features, such as an RS-232 interface, RPM system and maximum run timer, are not possible at all.

To overcome some of the limitations of the electromechanical control packages, some commercial door operators employ a solid state controller. The solid state controller includes microelectronics for controlling some of the logic functions and power control electronics for controlling the motor. The controller, or logic control device, is typically built onto a printed circuit board which is usually located within the electronic control box at the head of the operator. Specialized programmable functions, such as storing and responding to transmitter codes (if the operator has a radio control feature) and failsafe operation features (such as for a fire door), are usually handled on a separate programmable logic board, which also sits in the electronic control box. The solid state logic control device includes DIP switches for selecting control options, such as the B2, C2, D1 and E2 options described below. Other functions may be provided by software programs in an onboard nonvolatile memory and run by an onboard microprocessor.

One particular prior art solid state logic control device employs five triacs in lieu of contactors for controlling the motor. Four of the triacs are used in an H-bridge circuit to steer current in order to control the direction of rotation (the motor start coil of a single phase motor), one pair for the forward direction and the other pair for the reverse direction; the fifth triac is used to control the motor main coil. Since a triac is a solid state device and, in theory, should have no maximum useful switch cycles, a triac should be more reliable than a contactor. A contactor, or relay, will fail eventually due to mechanical fatigue or erosion of the electrical contacts or some other mechanical part anywhere from 50,000 to 500,000 cycles. While the five triac solution provides cost reductions over the contactors and relays used in the electromechanical control package, the triacs have proven to be less reliable than the contactors.

Triacs, while solid state, are susceptible to voltage spikes across the power line, or local dV/dt tolerance. In the prior art motor control in which the two pairs of triacs were joined together on either side of the motor start coil, one triac of each pair was connected to AC neutral, the other side of the triac pair was connected to AC hot. This enabled the triacs to reverse the polarity of the motor start coil, thus reversing the rotational direction of the motor. However, power line spikes, high dV/dt, can cause the triacs to switch on, when they should not. If a pair of triacs turns on simultaneously, this causes a dead short between AC neutral and AC hot through the triac pair, burning out the triacs or the printed circuit board traces.

In addition to the effect of power line spikes on the triacs, the motor itself can sometimes produce enough noise to turn on the triacs in the H-bridge circuit. Many of the traditional techniques for minimizing the effect of power line spikes have been tried: capacitors across the triacs, MOVs and snubber networks. Unfortunately, none of the traditional techniques have worked.

Many commercial door operators are equipped with single phase capacitor start motors, which include a start coil and a main coil. The motor is activated by supplying AC current to the start coil and the main coil. As described above, the start coil is used to give the motor its initial rotational direction (forward or reverse) and high starting torque characteristics. During operation, the motor accelerates to approximately eighty percent of its synchronous speed, at which point a mechanical governor opens the start coil circuit by opening an inline switch. After the motor reaches eighty percent (or such other manufacturer specified percentage of the motor's maximum rated speed), the start coil is no longer needed. Indeed, if the start coil is left energized, copper losses would cause the motor to overheat.

The mechanical governors used in the single phase motors generally consist of a centrifugal governor and switch assembly. While relatively inexpensive, they are unreliable. The most common malfunctions of the centrifugal governor and switch assembly are seizing of the governor and switch contact failure. Once the mechanical governor fails, the start coil cannot be activated on start up, resulting in no motor rotation.

Some motor manufacturers (and third party suppliers) offer built-in or add-on electronic modules for shutting off the start coil. These electronic packages are more expensive than the mechanical governors. For example, some motor controllers rely on a set time delay and no RPM measurement. In such systems, the start coil is energized for a predetermined time, say half a second, and then released. This approximation works as long as the motor will start and continue to rotate in the desired direction given temperature variations, load variations, starting torque requirements for the application. Commercial door applications generally require RPM measurements to adequately control the start coil.

To assist in the maintenance of the commercial door operator, many include a cycle counter. A cycle counter increments a mechanical odometer type counter every time the commercial door cycles open or closed. The odometer is then read, for example, during routine servicing of the operator and the door. If the odometer reading is beyond a certain cycle count, the service provider may elect to replace certain hardware or even the entire operator. In operators having an electromechanical control package, the cycle counter is an add-on unit, which increases the cost of the operator. The cycle counter is also typically mounted within the operator head, requiring the service provider to climb a ladder to read it. Also, the cycle counter provides no warning when cycle threshold counts are reached.

Most commercial garage door openers include a wall mounted switch for allowing a user to command the open/close/stop functions. When the service provider installs the operator or performs maintenance, it is often inconvenient for him to leave the operator and climb down the ladder to operate the open/close/stop switches on the wall.

There is a need for a controller for controlling a commercial door or barrier operator which is not sensitive to power line spiking, dV/dt, or motor noise. There is also a need for a controller which is robust and inexpensive. There is a further need for a controller which includes an integrated start coil control, eliminating the requirement for a mechanical governor. There is a need for a motor start control circuit which causes the motor to start and continue to rotate in the desired direction given temperature variations, load variations, starting torque requirements for the application. There is a need for a controller which can support additional functions, such as an integrated cycle counter and open/close/stop switches for adjustments.

SUMMARY OF THE INVENTION

To achieve the foregoing and other objects, a controller for controlling a motor and other functions in a commercial door or barrier operator according to the invention is described. The controller eliminates dV/dt sensitivity by eliminating the four triacs in the current steering H-bridge circuit for selecting the direction of rotation (e.g. in a single phase motor for activating the start coil) and replacing them with two dual-pole-dual-throw (DPDT) relays. The fifth triac is used to control the current to the main (or third) coil of the motor. While the fifth triac may still be turned on by power line spikes and motor noise, since it is in series with the large impedance of the motor, it is not susceptible to shorting out.

In this application, the use of DPDT relays is not a problem because of their apparent shorter life. In the single phase motor main switching and hold current flows through the motor main coil so the start coil is energized for only about one half of a second per operation cycle. After the motor reaches a predetermined percentage (e.g., 80%) of its manufacturer's defined maximum synchronous speed, the start coil is released and the main coil and its switching means provide the brunt of the electrical work. And, since DPDT relays are less costly than triacs, using a combination of two DPDT relays to control the start coil current (or control direction of rotation in a three phase motor) and a triac to control the main (third) motor coil provides a very robust and inexpensive system.

An integrated motor start control for a barrier operator according to the invention includes a speed governor integrated into the controller. The integrated speed governor has an RPM sensor for detecting the speed of the operator's limit shaft coupled to software run by the microprocessor. Motor output speed depends on manufacturer, manufacturer's lot, temperature of operation and environment, load and starting requirements. Measuring the output of the motor itself, as discussed above, can be costly especially if an RPM sensor is built into the motor. Measuring the RPM of the operator's limit shaft is an easier and more effective means of determining motor output.

The limit shaft is used to set the door open and close limits of travel. It is coupled to the motor output shaft but rotates at a reduced percentage of the motor output shaft using gear reduction. When the motor is installed on the operator, the limit shaft speed can be measured and the predetermined percentage calculated and stored in the onboard memory. The microprocessor or other digital control device, such as an ASIC, gate array or programmable logic device, is programmed to open a switch when the limit shaft RPM reaches a fixed percentage, say, 80% of the measured maximum limit shaft speed. A simple switch coupled with the programmable feature provides greater reliability, convenience and lower cost than a centrifugal switch. Many different types of RPM sensors may be used. A preferred RPM sensor consists of an interrupter cup and interrupter module.

An onboard cycle counter enables the installer or service provider to program a desired cycle count into the onboard memory. When the microprocessor detects that the number of cycles (such as the number of times the microprocessor opened the start coil switch) reaches the predetermined amount, a warning light is activated. The warning light can be a light emitting diode (LED) mounted on the head unit and/or an LED mounted on the wall control unit. In this way, the customer is alerted to the fact that the door has cycled the predetermined number of cycles and that service should be provided. Alternatively, a display can be mounted on the head unit and/or on the wall unit. A display may show the actual count value stored in the memory. Additionally, if the operator has an RS-232 port, the value of the cycle counter can be interrogated and inspected at any time at a remote location and the value displayed on, for example, a computer display. For example, the cycle count can be checked when a part of the operator or door is being replaced to gain knowledge of the field life of the item.

To facilitate installation, adjusting and testing of the commercial door operator, onboard open/close/stop switches are provided on the logic control device. This enables the service provider to open, close or stop operation of the door from the operator, without having to climb up and down the ladder or walk over to the wall switch. Additionally, the onboard open/close/stop switches may be used to program in various functions to the operator.

BRIEF DESCRIPTION OF THE DRAWINGS

FIG. 8 is a flow chart showing the programming of the cycle counter;

DETAILED DESCRIPTION OF THE PREFERRED EMBODIMENTS

Figure 1:
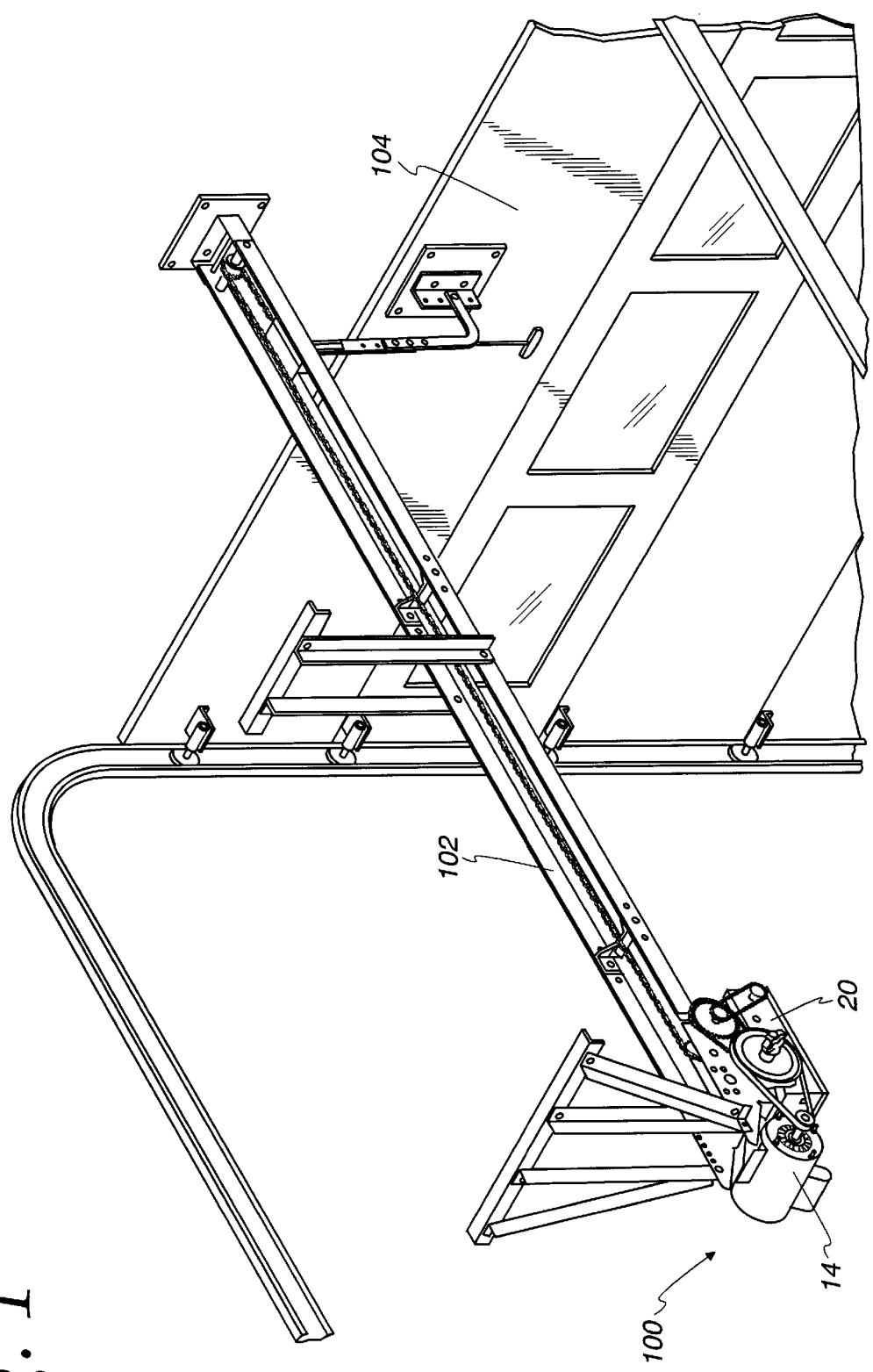
FIG. 1 is a perspective view of a door operator mounted to a rail/chain driven door.
Figure 2B:
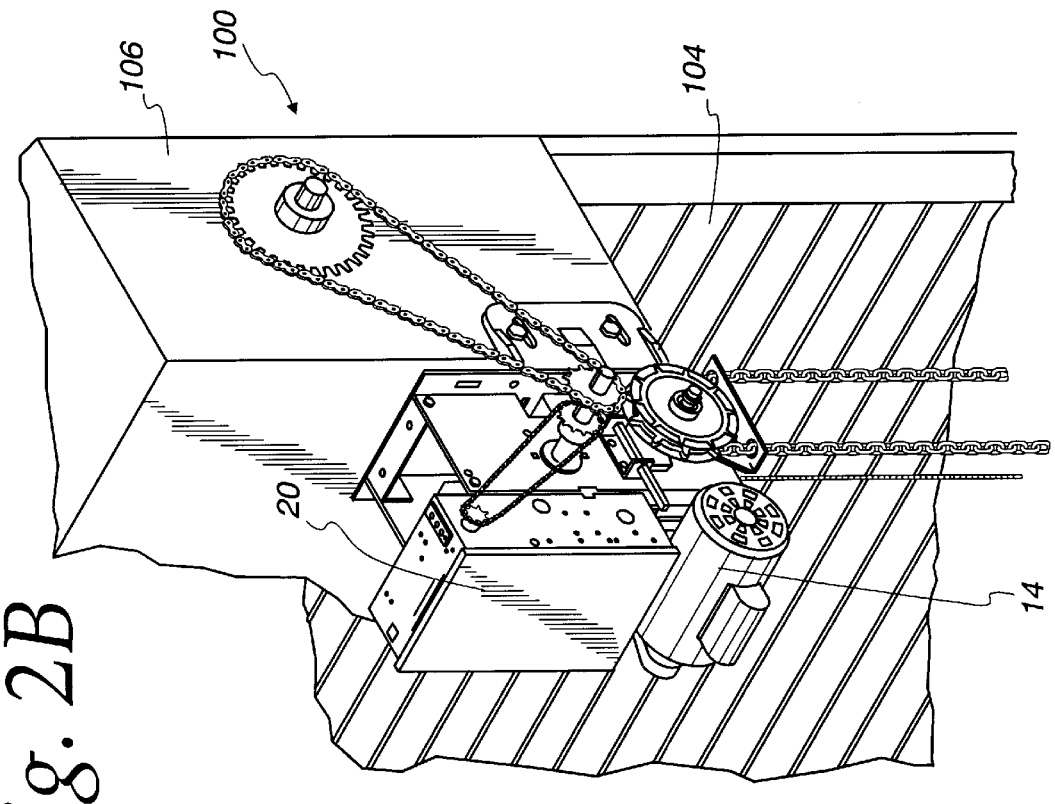
FIGS. 2A and 2B are perspective views of a door operator mounted to a jackshaft driven door.
Figure 2A:
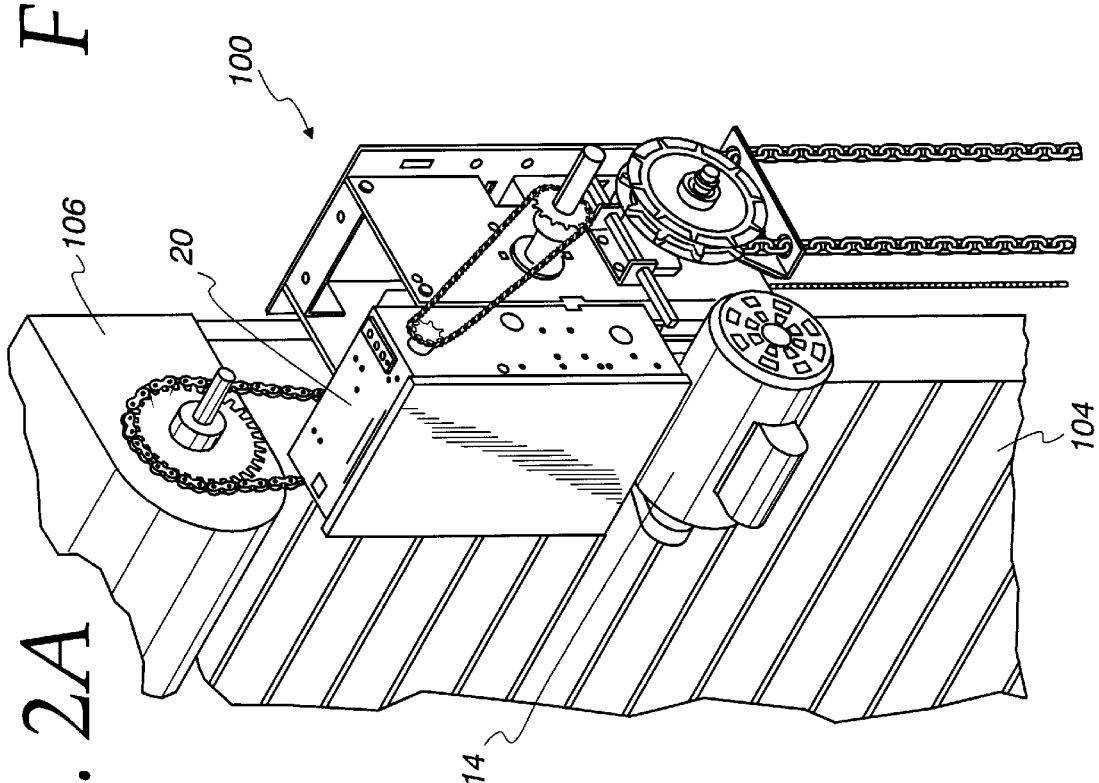
Figure 3A:
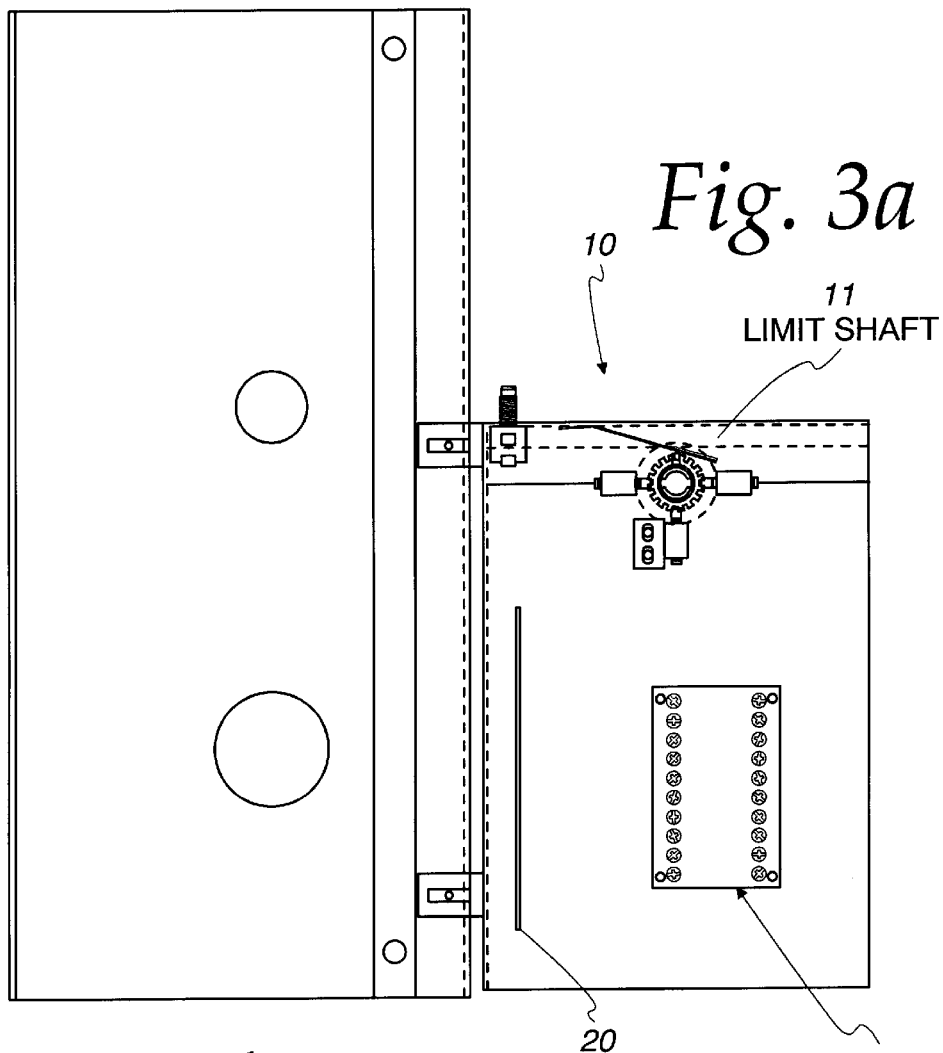
FIGS. 3A, 3B, 3C and 3D are exterior views of an electrical box of the door operator of FIG. 1.
Figure 3B:
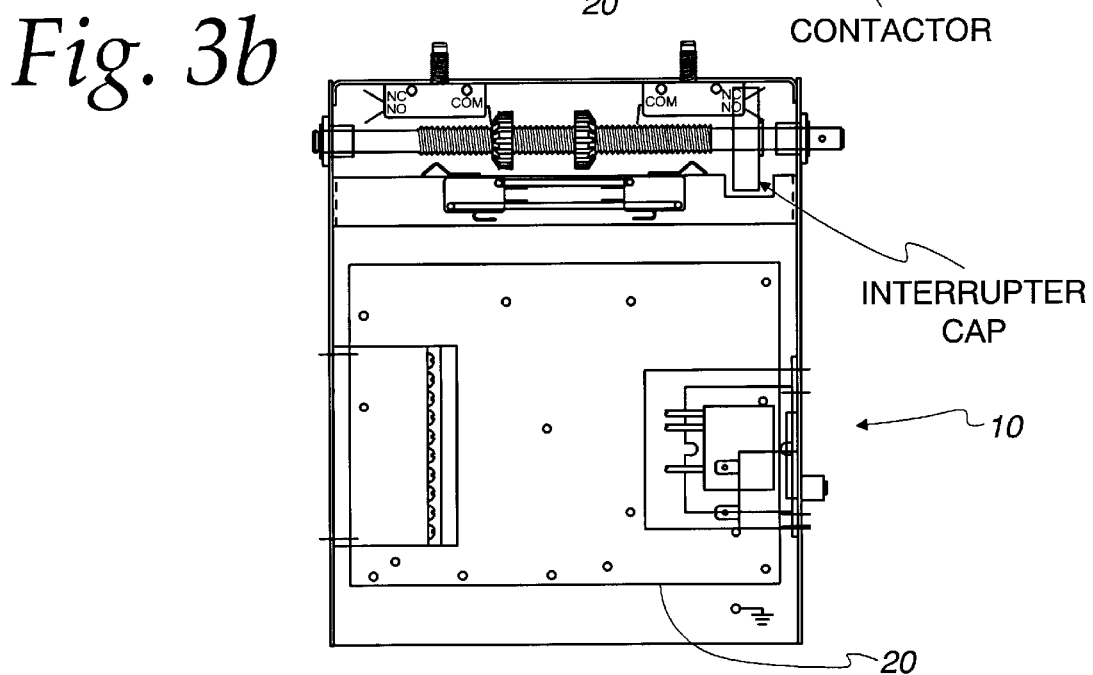
Figure 3C:
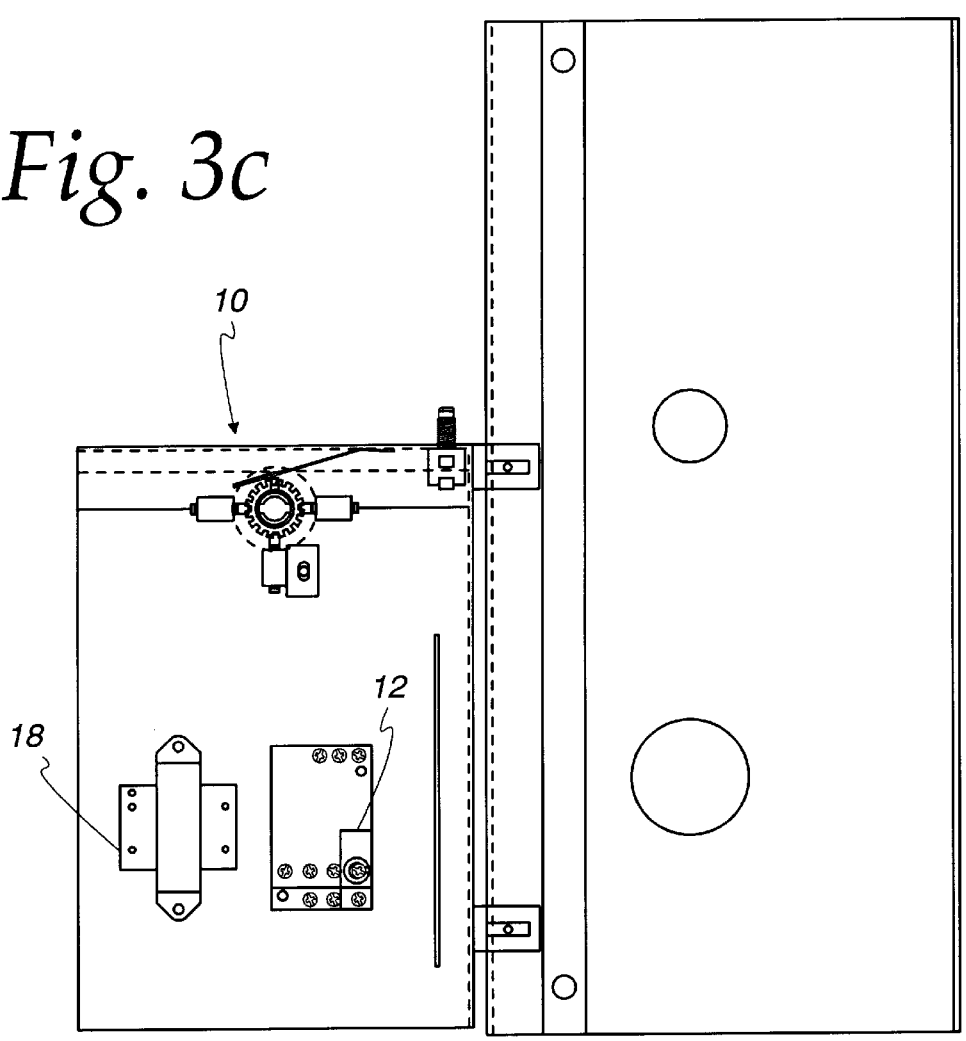
Figure 3D:
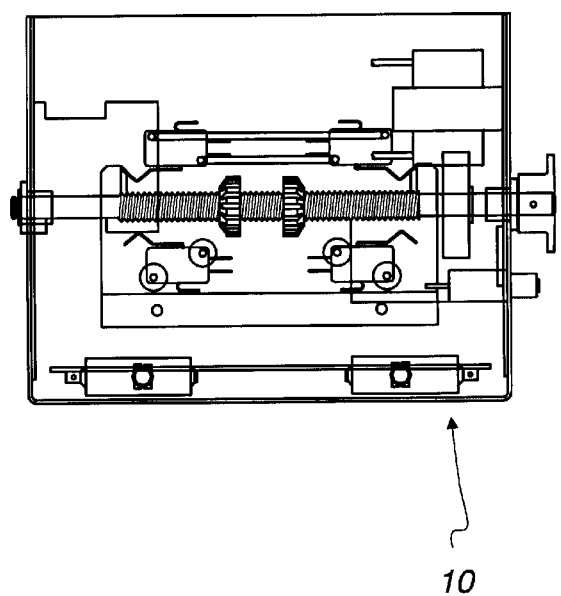

Referring now to the drawings and especially to FIG. 1, a door or barrier operator embodying the present invention is shown and generally identified by at an end of the rail 102 for moving a door 104. FIG. 2A shows a wall mounted operator 100 driving a jackshaft type door. FIG. 2B shows the operator 100 mounted to the door housing 106. Each door operator 100 includes a motor 14 and electronics box 10, where the controller is located.

Figure 4:
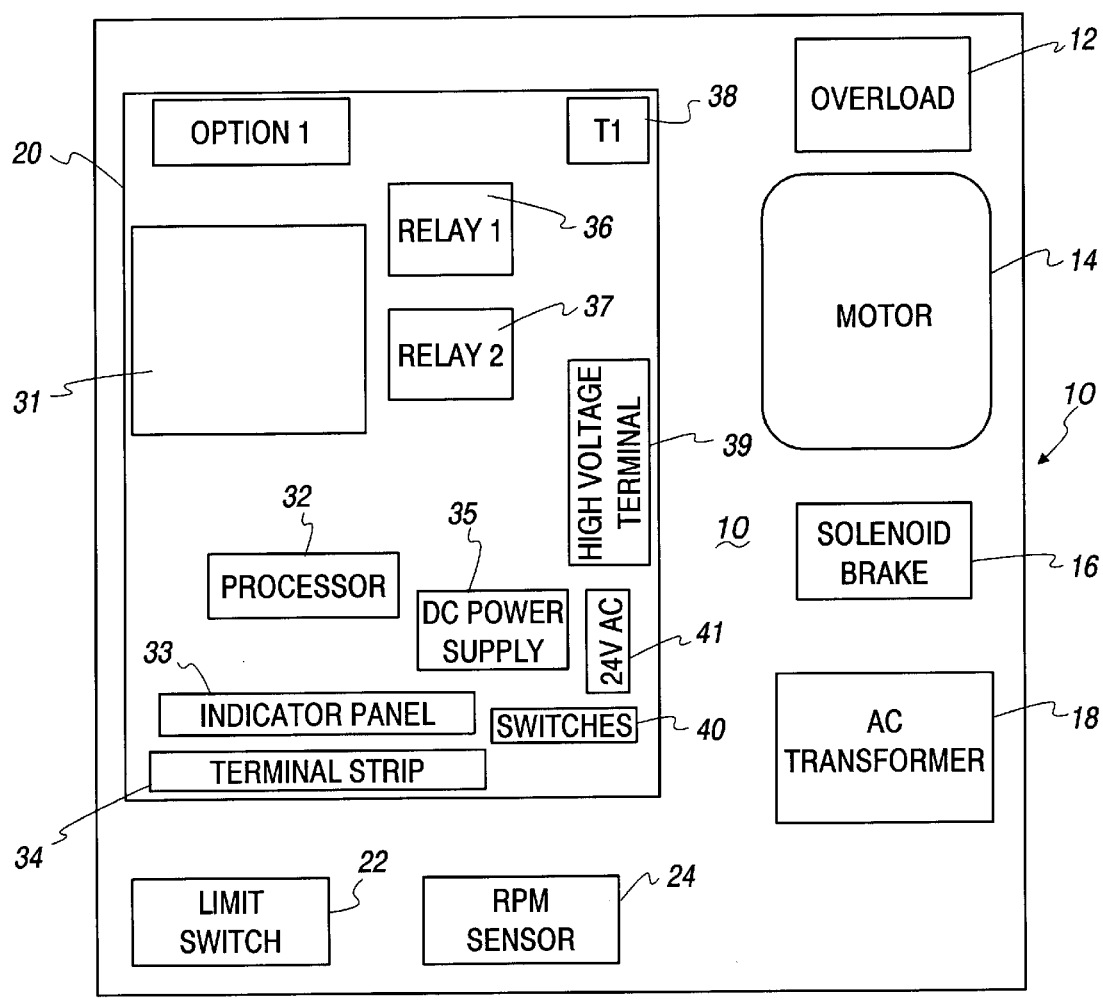
FIG. 4 is a block diagram of a door operator including a logic control device according to the invention.
Figure 6A:
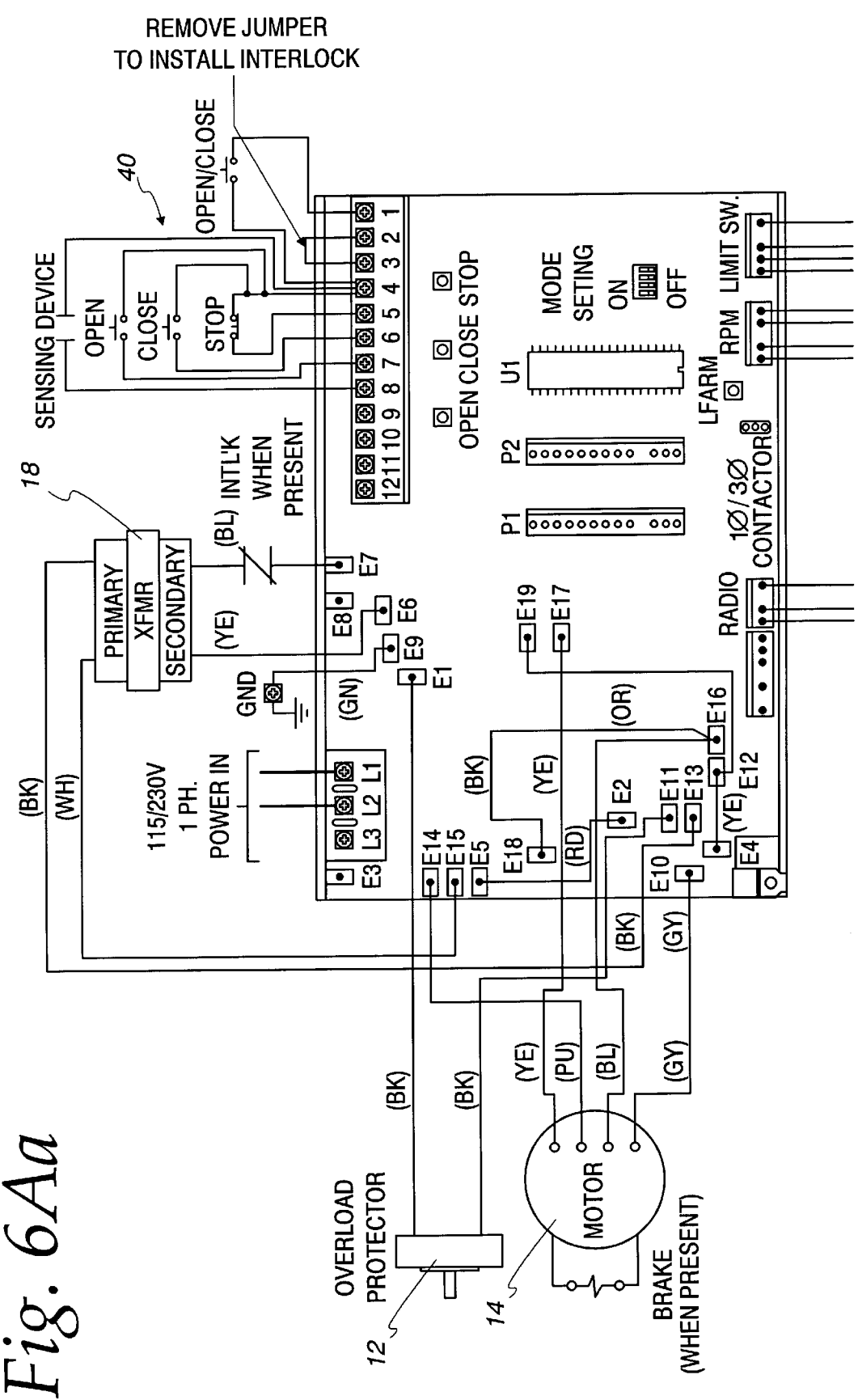
FIGS. 6A and 6B are schematic drawings showing some of the electrical connections among the elements shown in FIG. 1.
Figure 6B:
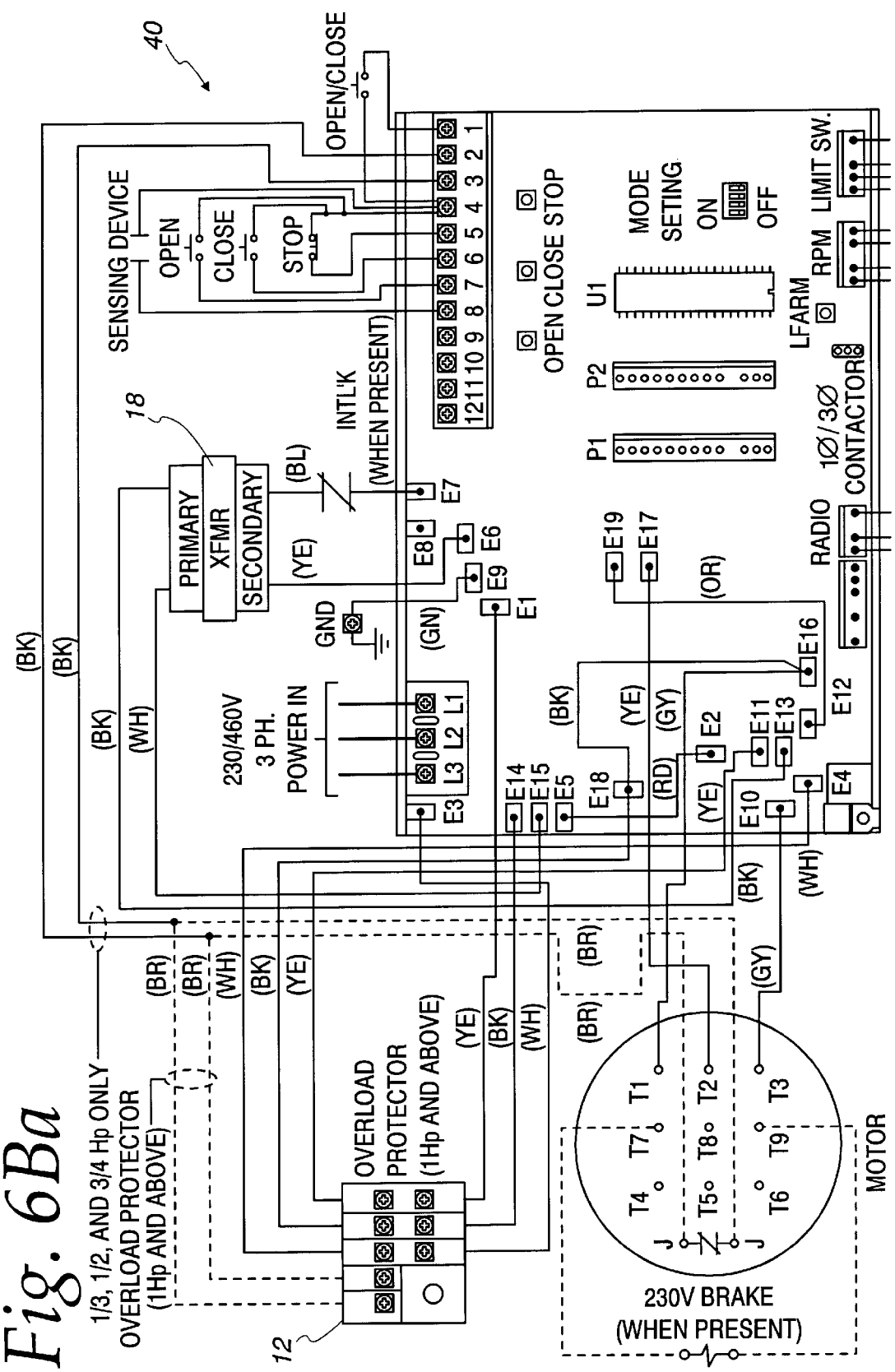

FIGS. 3A, 3B, 3C and 3D are side views of portions of operator 100. Electronics box 10 houses the controller 20, AC transformer 18, overload protection 12 and the limit shaft assembly with limit shaft switches A schematic layout of electronics box 10 of commercial door operator 100 is shown in FIG. 4. Terminal connections for controller 10 are shown in FIGS. 6A and 6B. Electronics box 10 houses a motor 14, solenoid brake 16, AC transformer 18, overload 12, limit switch/shaft assembly 22, RPM sensor assembly 24 and controller 20. Overload protection 12 includes an inline thermal circuit breaker. Brake/solenoid 16 is inline with the main winding of the motor. AC transformer 18 is used to provide secondary connections. Preferably, it will provide primary voltages of 120 VAC, 240 VAC, 480 VAC or 600 VAC, with a secondary voltage range of 24 VAC RMS, minimum of 20 volt-amperes and maximum of 100 volt-amperes at a frequency of 50/60 Hz.

Logic control device 20 includes processor 32 which controls operation of all the electronic functions on the control device. A Zilog brand microprocessor with 8K of onboard ROM (Z86E43) provides added programming functionality. While the Zilog microprocessor includes some onboard memory, preferably an additional EEPROM memory chip (not shown) is used to store various programmable function values and data.

Figure 5:
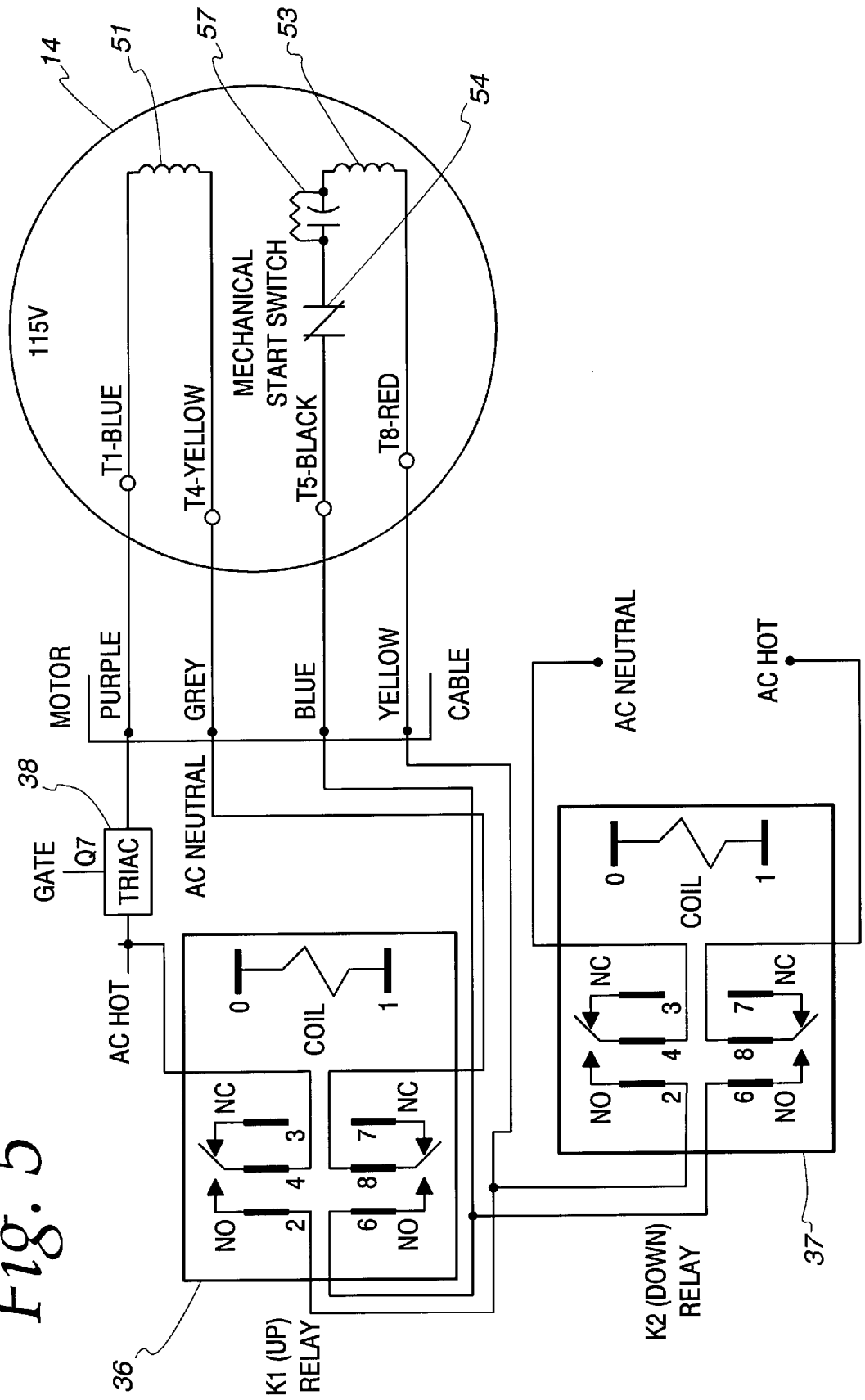
FIG. 5 is a schematic of a control circuit for a commercial door operator motor according to the invention.

Two C-form relays are used to select the direction of rotation for the motor (up or down; open or close). A single triac is used to operate the motor's main coil. This puts non-solid state components at the critical point of the H-bridge, eliminating quality problems with the prior art five triac system. Directional relays 36 and 37 activate the start coil to set the rotational direction of motor 14 (up/down or open/close). Preferably two C form relays (DPDT) are used to switch polarity or phase of the motor start coil 53 (FIG. 5). The preferred manufacturer is P&B, part number T92. Triac 38 activates the main coil of motor 14 by allowing main coil current to flow. Preferably triac 38 includes a triac coupled with an optoisolation triac, which is used to provide high current switching capability in line with the main motor winding. Connection of single phase 115 volt and single/three phase 230 volts is done directly on high voltage terminal 39. For higher voltage or higher horsepower motors, the secondary of the transformer 18 will be connected to high voltage terminal 39. Controller 20 will have the option of interfacing directly with size 0 and 00 contactors for operators at higher voltages. Contactors (not shown) would then be used to handle the high voltage switching and be controlled by relays 36, 37 and triac 38.

DC power supply 35 includes two separate DC power supplies. A 5 volt supply furnishes 5 volt potential to controller 20 and a 24 volt power supply provides 24 volt potential to service the relay coil drive. Local switches are provided for open/close/stop to enable the installer or service provider to make adjustments directly at the electrical box and for programming the operator. Switches 40 include a four pole DIP switch used for setting modes and programming the operator. Switches 40 also include four momentary switches for radio learn, open, close and stop functions. These functions can be used by a service provider during installation, testing and maintenance. Indicator panel 33 includes LEDs for indicating, for example, when the cycle counter has counted a predetermined number of cycles. Terminal strip 34 provides for connection to other boards, sensors and power supply connections in the commercial door operator.

Limit switch assembly 22 provides for setting of the open (or up) and close (or down) limits of travel of the door. The RPM sensor 24 in combination with the microprocessor 32 is used to eliminate the centrifugal switch. The RPM sensor and microprocessor control current to the start coil and permits more accurate control of start coil cutoff. RPM sensor 34 measures the rotation of the limit shaft. Additional connectors may be provided for interfacing with accessory boards, such as a self-monitoring IR system and a warning signal board (not shown).

A control circuit for controlling operation of a single phase motor 14 is shown in FIG. 5. Triac 38 is shown in series with main coil 51 of motor 14 between AC hot and AC neutral. When triac 38 is switched on, it supplies AC current to the main coil 51 of the motor 14. When the user selects open (up) or close (down) from a wall switch (not shown), either directional relay 36 (up) or relay 37 (down) is activated to supply AC current to the start coil 53. With either relay 36 or 37 in the circuit, start coil 53 is in series with main coil 51. When switch assembly 54 detects that motor 14 has reached a predetermined percentage of its maximum rotational speed, it opens taking start coil 53 out of the circuit, leaving only main coil 51 to drive the motor 14. Switch assembly 54 can be a mechanical switch, such as a centrifugal switch assembly or an RPM sensor assembly. The inserts in FIG. 6Ab show 115 V and 208/230 V single phase motor connections.

If switch assembly 54 comprises the preferred RPM sensor assembly, a photointerrupter measures limit shaft speed (reduced value of motor output shaft speed) and applies the value to microprocessor 32 (FIG. 4). Microprocessor 32 compares the detected limit shaft speed with a stored value, Sm, the maximum shaft value in nonvolatile memory. When the detected limit shaft speed reaches, for example, 80% of Sm, microprocessor 32 shuts off the directional relay 36 or 37, disengaging the start coil 53. The main coil 51 continues to operate the motor 14 until the microprocessor shuts off AC power to the main coil.

FIGS. 6Ba and 6Bb show the connections for a 230 VAC three phase motor in which triac 38 applies current to coil T3 of motor 14 at connection E10, and relays 36 and 37 are connected at connections E16 and E17 to provide current and direction of rotation to coils T1 and T2 of motor 14. Inserts in FIG. 6Bb show 208/230 VAC and 460 VAC three phase motor connections.

Referring to FIGS. 11A, 11B, 11C and 11D, microprocessor 832 is shown as a Zilog brand model Z86743. Additional nonvolatile programmable memory is provided by EEPROM 850. Connectors P1 and P7 provide a connection for optional contactors in the event a higher voltage door operator is required. For the small voltage systems using the smaller motors with 115 V or 208/230 V supplies, control is provided by the triac/DPDT relay control. In response to a user command, microprocessor 832 sends an enable command to optoisolator triac 838 via pin P01 which enables triac 840. In response to a directional input from the user, microprocessor 832 enables either relay 836 or 837 via pins P00 and P35. RPM input from the off board RPM sensor is provided at terminal 803 to microprocessor 832. Similarly off board limit switch information is provided to microprocessor 832 via terminal 802. Onboard switches S3, S4 and S2 provide open, close and stop functions with corresponding LEDs. Switch panel S1 contains 4 DIP switches for setting the various operating modes described herein.

Figure 7:
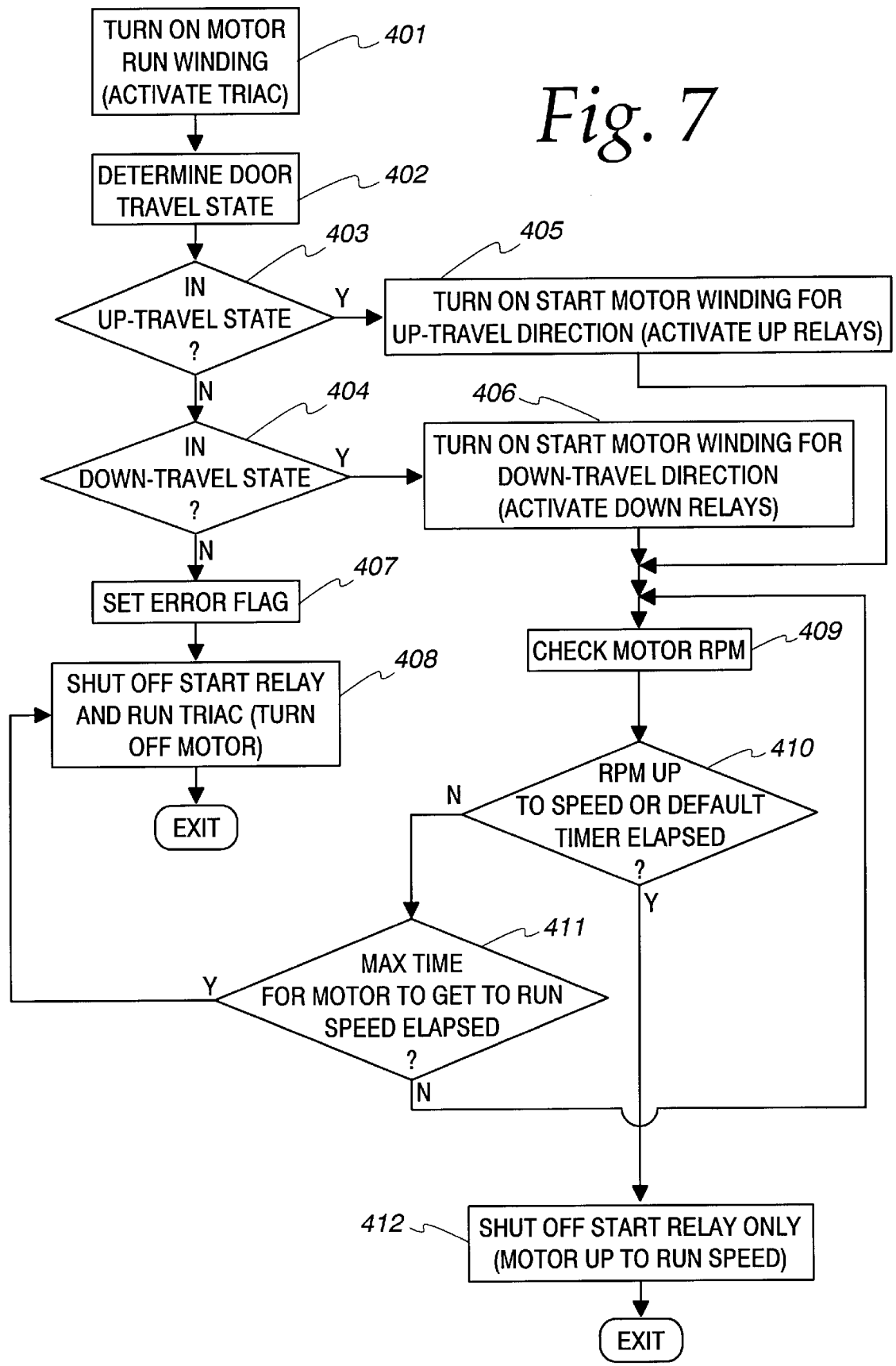
FIG. 7 is a flow chart showing the motor start procedure.

A flowchart of the motor start procedure is shown in FIG. 7. Microprocessor 32 controls current to the motor start and run windings. After the motor is up to speed, the start winding is turned off and the run (main) winding left on. As a safety precaution, if the motor does not achieve a predetermined speed after a set time, the motor is turned off by interrupting current to the main coil and to the start coil. Referring to FIG. 7, the microprocessor responds to a command from the open or close switch and turns on the motor's Run (or main) winding by activating the triac in Step 401. In Step 402, the routine determines the door's travel state. In Step 403 it checks for Up-Travel state. If the answer is yes, it turns on the motor start winding, by activating the Up relay in Step 405 and then shifts to Step 409. If the answer is no, in Step 404 it checks for Down-Travel state. If the answer to this is yes, it turns on the motor start winding by activating the Down relay in Step 406 and then shifts to Step 409. If the answer is no, it sets the error flag in Step 407, then in Step 408 shuts off the Start relay and the Triac, thereby turning off the motor and exits.

At Step 409 it checks for motor RPM. If the RPM is up to speed or the default timer has expired in Step 410, it shuts off the Start relay only and allows the motor to continue to run in Step 412, then exits. If the RPM is not up to speed or the timer has not expired, it checks for maximum time in Step 411. If the answer is no, it branches back to Step 409. If the answer is yes, it branches to Step 408.

A logic control device for use in a commercial door operator must be capable of operating at temperatures from −40 degrees Celsius to +65 degrees Celsius. The logic control device must operate with 115 V, 208 V, 240 V, 380 V, 460 V and 575 V single and three phase (50 and 60 Hz) door operators. Although, in general, higher voltage operators (460 V and 575 V) may require contactors in lieu of relays due to the extremely high currents. The logic control device must endure 250,000 cycles without a major failure.

Integrated Motor Start Coil Control

To properly control the start coil, the motor RPM must be measured. At 80% (or some predetermined percentage depending on the particular motor chosen for the operator) of the motor's rated RPM, the start coil is released and the motor continues to turn in the same direction, activated by the main coil.

Many motor controllers measure RPM at the main rotor shaft. This is generally cumbersome and requires invading the motor itself. For RPM measurement, measuring the limit shaft speed of the door operator provides several advantages. The limit shaft assembly is used to maintain the proper relationship between the door position and the operator control state. It is a separate shaft and not part of the motor. The limit shaft's RPM is directly related to the motor shaft's RPM, but reduced. The amount of RPM reduction depends on the operator type and must be calibrated for each operator and when the motor is replaced. In order to measure the limit shaft's RPM, an interrupter cup and photointerrupter module are used. Alternatively, a Hall effect sensor and a ring magnet or one of the numerous available methods of measuring shaft revolution speed may be used.

There is generally no fixed relationship between the limit shaft revolution speed and that of the motor; the relationship varies from motor to motor, even if the motors are the same type and rating. Since limit shaft speed is used to predict motor shaft speed, it is critical to obtain the relationship for each door operator. Given unit differences, each unit must be calibrated when produced and whenever a motor is replaced. Calibration includes the following steps. First, the door operator is placed in the factory test mode. Then run the operator without a load (no door) and measure the limit shaft RPM after two seconds (Sm). Store Sm in non-volatile memory as a representation of a full speed motor. Compute 80% of Sm and use this as the cutoff value of the limit shaft speed to release the start coil.

Figure 10:
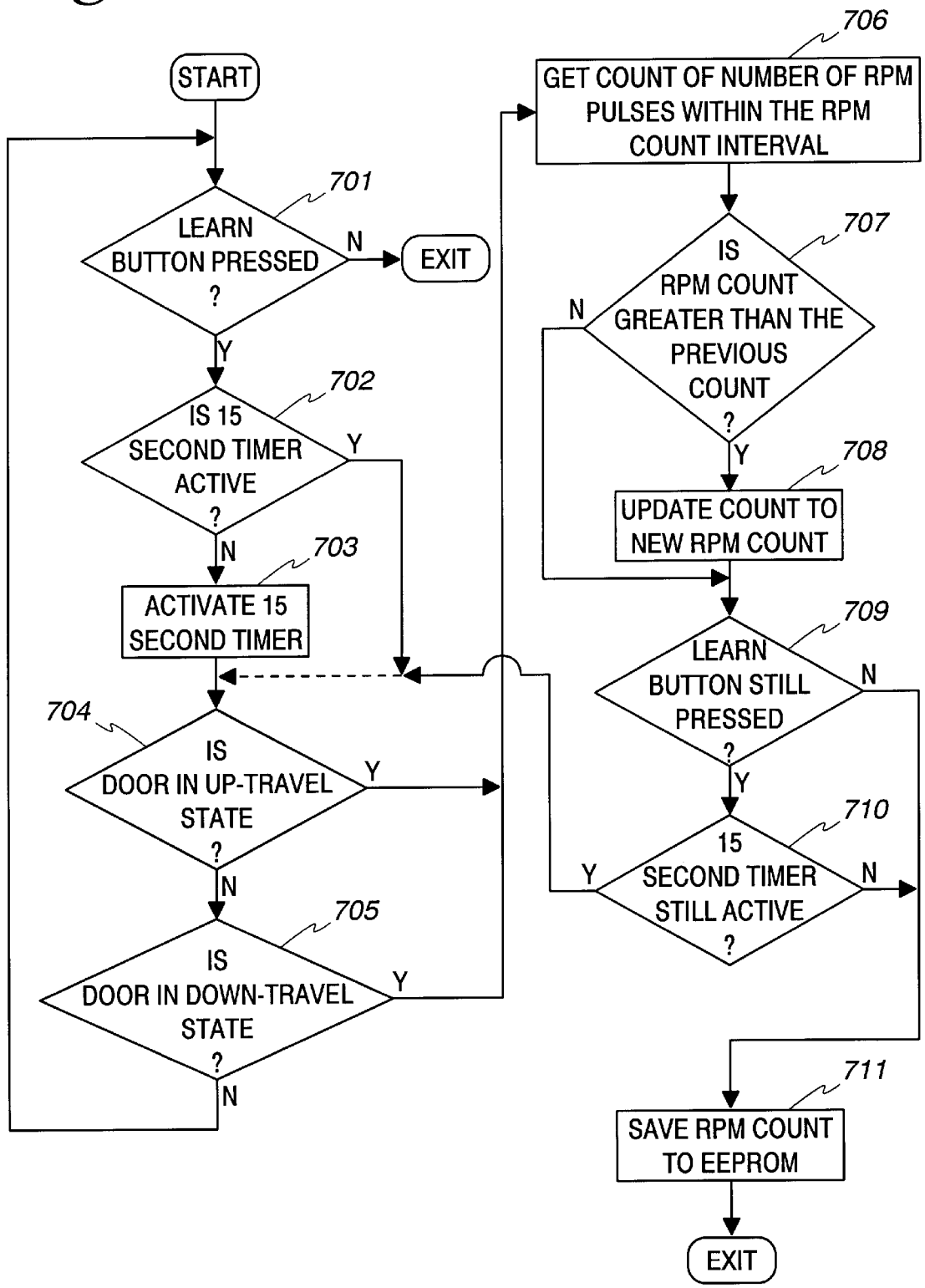
FIG. 10 is a flow chart showing programming of the RPM sensor.
Figure 11A:
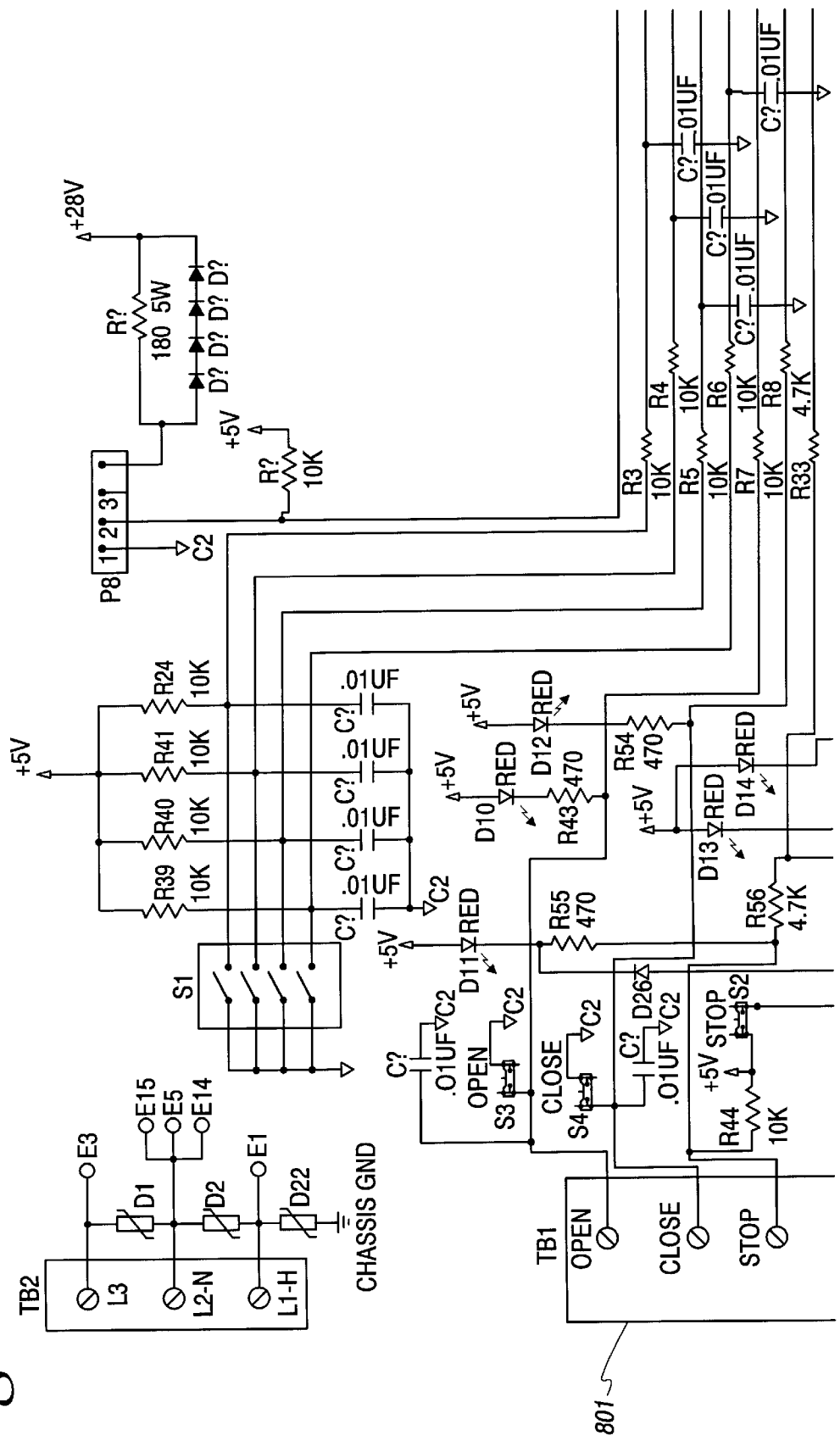
FIGS. 11A, 11B, 11C and 11D are detailed schematic drawings showing the electrical connections among the elements of the logic control device of FIG. 4.
Figure 11B:
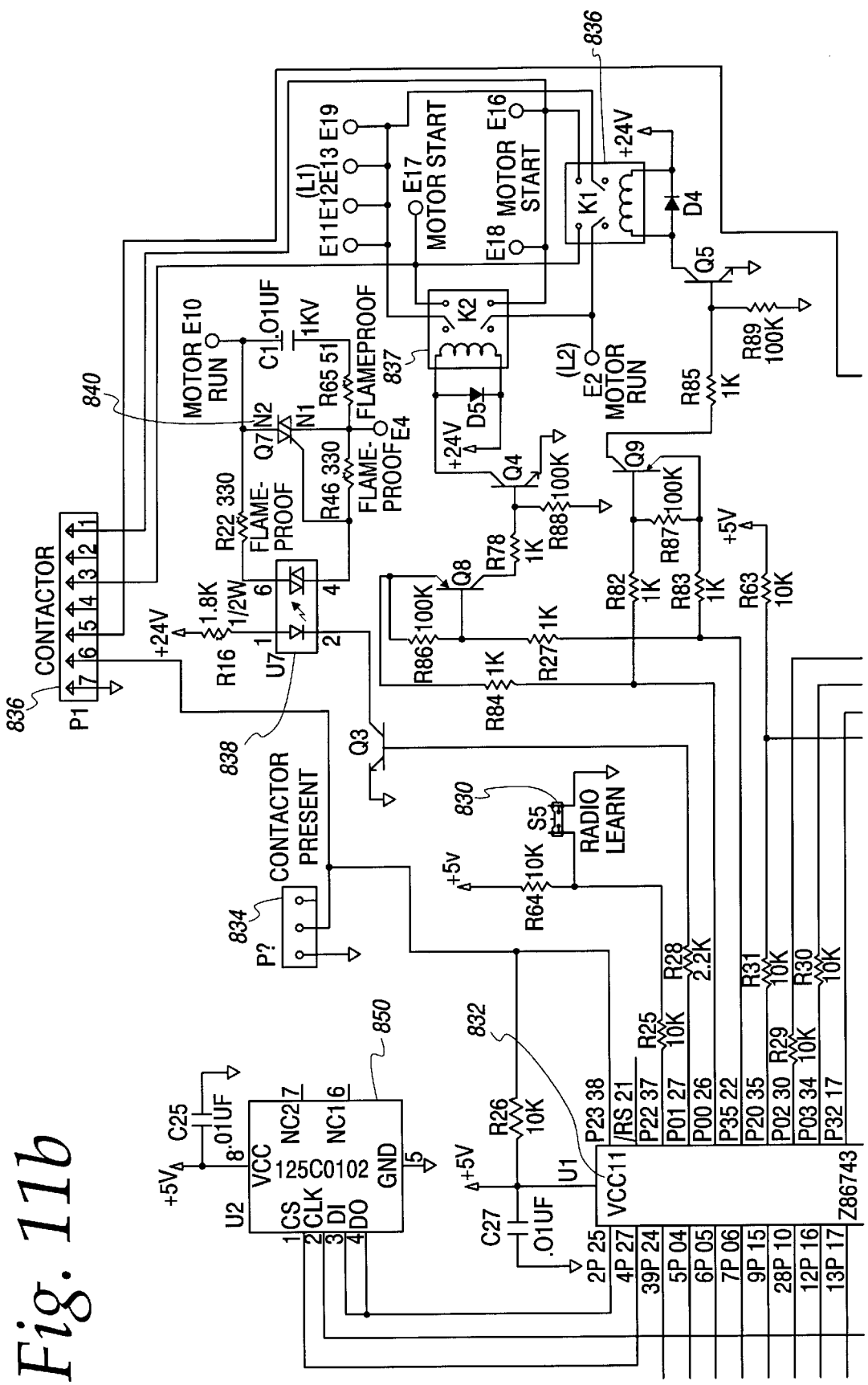
Figure 11C:
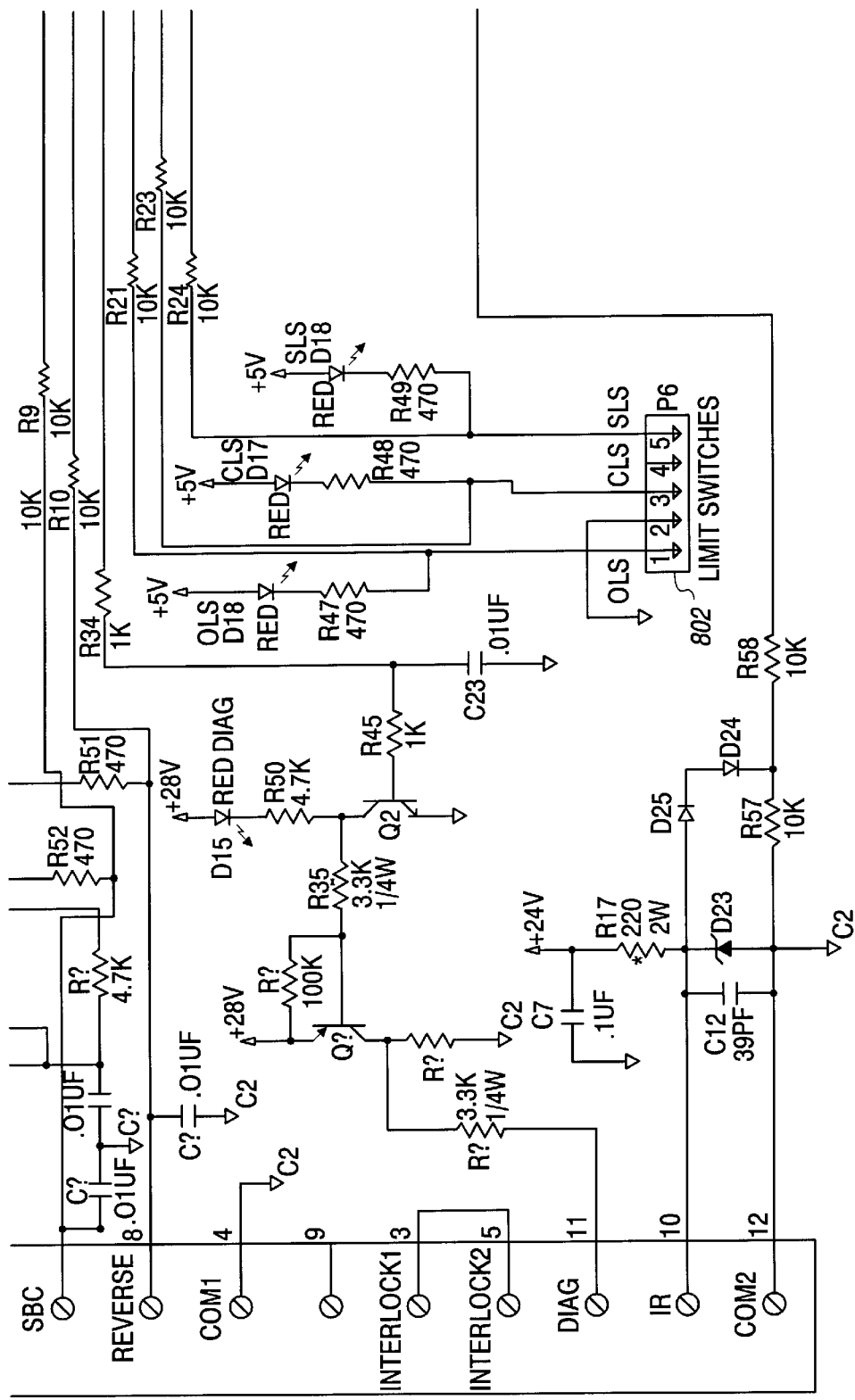
Figure 11D:
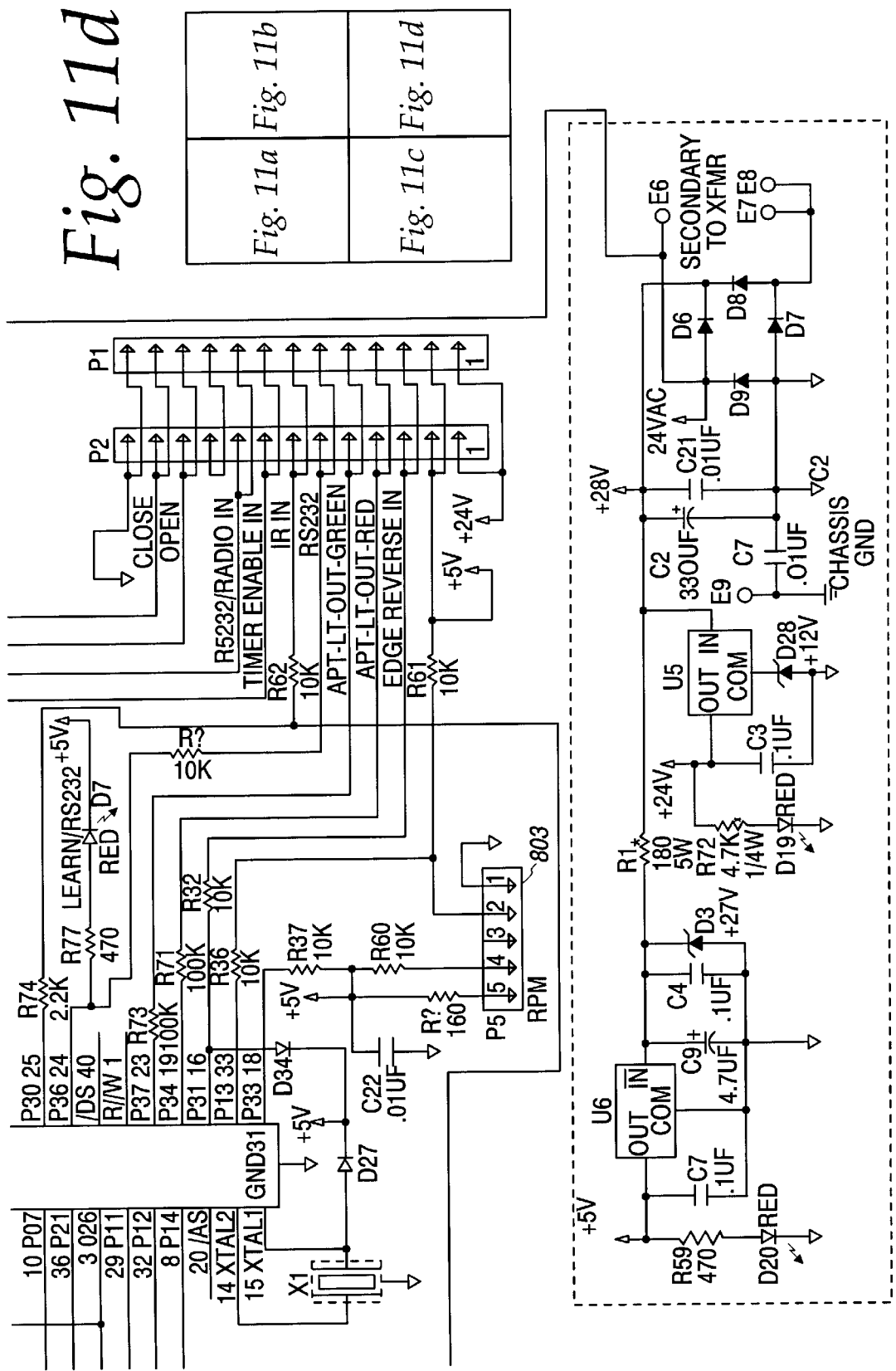

Further details of the RPM programming process are shown in FIG. 10, the Motor RPM Learn Process. When the door operator is running in a stable door opening and door closing manner, the learn button is pressed, Step 701, to put the operator in the RPM sensing mode. Maximum learn time is limited to 15 seconds. In Step 702, the routine checks to see if the 15 second timer is active. If the 15 second timer is not active, Step 703, the routine activates the timer. Then the routine checks if the door is in the Up-Travel state, Step 704. If not, the routine checks if the door operator is in the Down-Travel state, Step 705. If it is not, the routine returns to Step 701. If the answer is yes to either of Steps 704 or 705 is yes, the routine branches to Step 706 where it gets the count of the number of RPM pulses within the RPM count interval. In Step 707 the routine checks if the RPM count is greater than the previous count. If yes, it updates the count to the new RPM count in Step 708. If no, it checks for the learn button still pressed at Step 709. If the learn button is not pressed, the routine saves the RPM count in memory at Step 711 and exits. If the learn button is still pressed, the routine checks the 15 second timer in Step 710. If the 15 second timer is still active indicating that less than 15 seconds have elapsed, the routine branches to Step 704. If the 15 second timer is not active indicating it has timed out, the routine saves the RPM count in memory at Step 711.

Programmable Integrated Cycle Counter

Cycle count information may be retrieved in many different ways. The simplest method is to turn on an LED or other light when the cycle counter reaches the preset limit.

Alternatively, cycle count data can be downloaded or interrogated through an RS-232 link having an RS-232 port connected to microprocessor 32 on controller 20.

A diagnostic LED may be located both on the logic control device and the wall unit, next to the three button controls (open/close/stop). The diagnostic LEDs flash at both the controller in the head unit and the wall unit when the cycle counter reaches the preprogrammed cycle count. The preprogrammed cycle count may be stored in the controller's nonvolatile memory at installation by the service provider using DIP switches or push button inputs. Each time the door operator causes the door to open or close, microprocessor 32 increments a counter which is then compared with the preprogrammed cycle count. When the microprocessor detects a match, it enables the LED indicators. Prior to LED indication, a service provider can download the stored cycle count from the microprocessor through the RS-232 port to obtain information on the number of cycles the operator has cycled the door.

The RS-232 link can be built directly onto the logic control device or implemented as an alternate, add-on board, which plugs into one of the available option slots on the logic control device. With the add-on board, the microprocessor can be queried and output the exact cycle count. The cycle count can be obtained by a computer connected to the RS-232 port, or a self-contained monitoring module with RS-232 interface and a display for displaying the current count.

The predetermined number of cycles for the cycle counter is learned or programmed by programming the microprocessor according to the steps described in FIG. 8. Referring to FIG. 8, the routine first checks to see if the microprocessor is in any other modes in Step 501. The routine checks if the microprocessor is in the diagnostic mode in Step 502. If the answer is no, it branches to Step 501. Cycle count cannot be stored unless the microprocessor is in the diagnostic mode. If the answer is yes, it checks for Learn switch depressed in Step 503. If no, it branches to Step 501. If yes, it increments the counter in Step 504. In step 505 it checks for the mode DIP switch. If yes, it branches to step 503. If no, it multiplies the counter by 5000 in Step 506. In Step 507 it stores the cycle count in memory and exits.

Figure 9A:
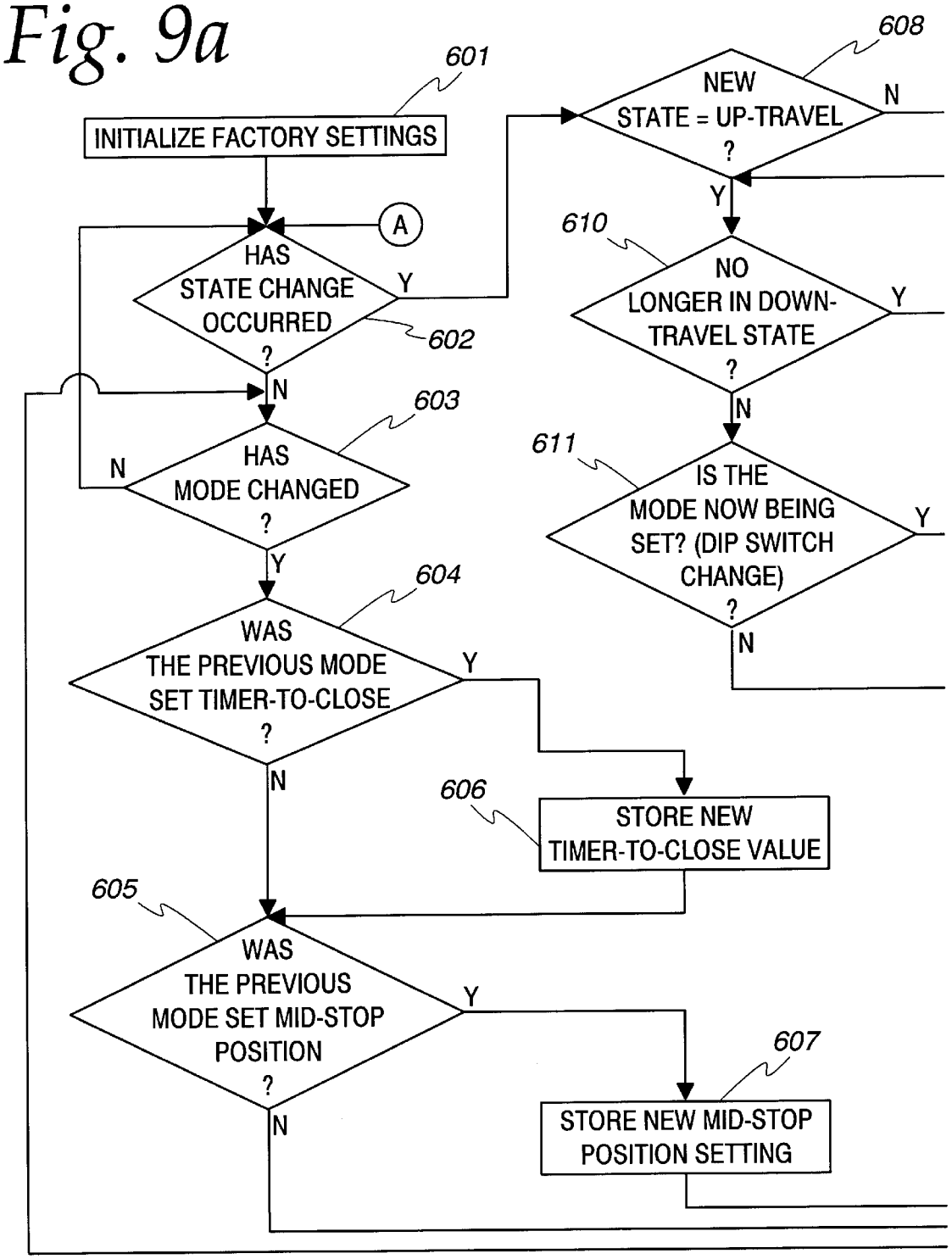
FIGS. 9A and 9B are flowcharts showing operation of the cycle counter.
Figure 9B:
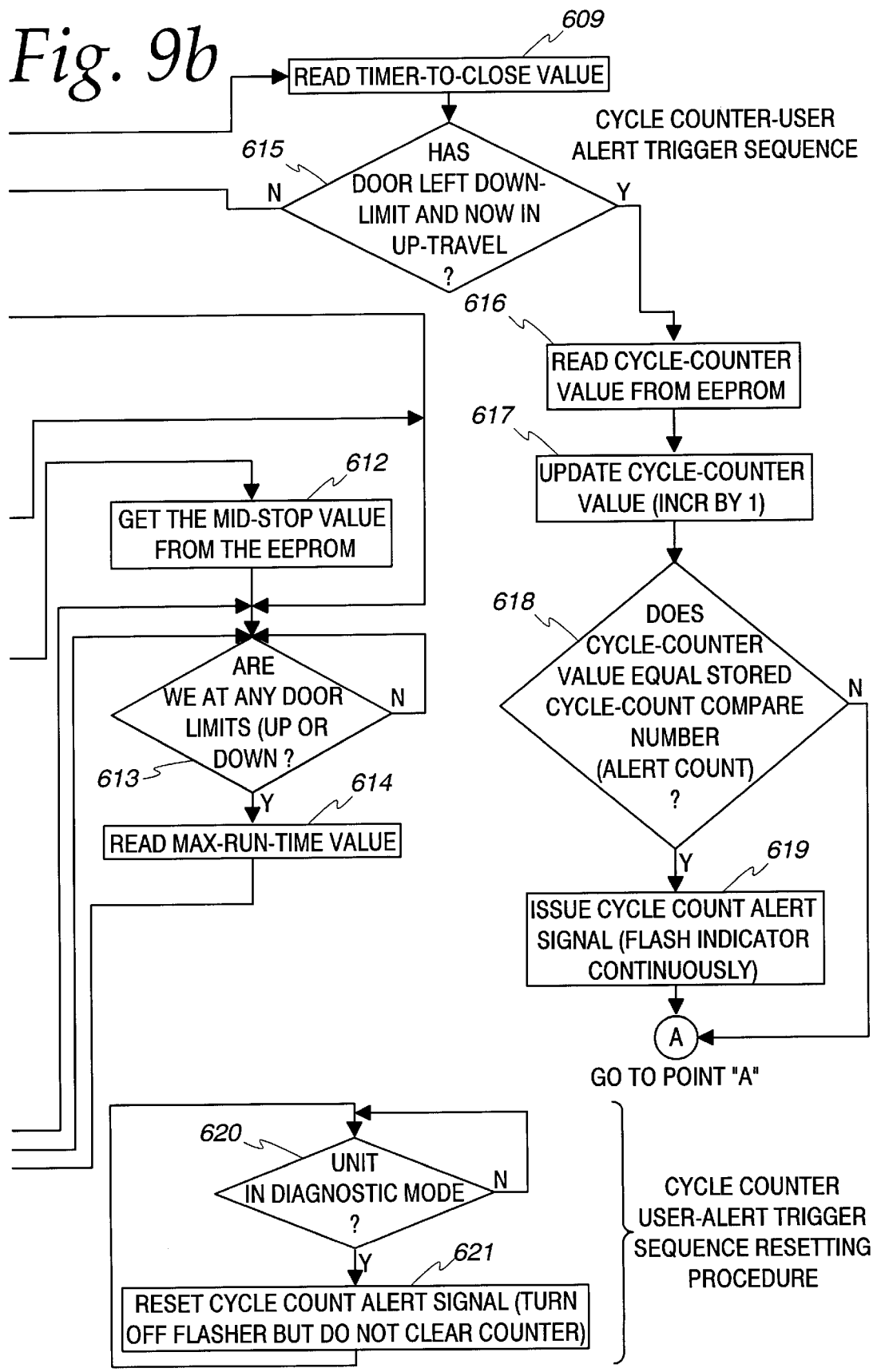

The cycle counter increments a count of the number of times the door is opened and closed. The counter is incremented when the door operator is in the up-travel state after leaving the down limit. Referring to FIGS. 9A and 9B, cycle counting begins at Step 601 with the factory initialized settings. In Step 602 the routine checks for a state change. If no, the routine checks for a mode change in Step 603. If no, the routine branches back to Step 601. If yes, in Step 604 the routine checks for the previous set timer-to-close. If yes, the routine stores the new timer-to-close value in Step 606. If no, in Step 605 the routine checks if the previous mode was set mid-stop position. If yes, it stores the new mid-stop position in Step 607. If no, the routine checks for any up or down limits at step 613. If yes, it reads the max-run-time value at Step 614 and branches back to Step 603. If no, it cycles back to Step 613.

If the answer to Step 602 is yes, the routine checks for a new up-travel state in Step 608. If no, the routine reads the timer-to-close value in Step 609 then checks if the door has left the down limit and is now in up-travel at Step 615. If the answer to Step 615 is no, it branches to Step 610. If the answer to Step 615 is yes, it reads the cycle counter value in memory at Step 616. Then it increments the cycle counter by one in Step 617. At Step 618 the routine checks if the cycle counter value equals a stored value. If no, the routine branches to Step 602. If yes, the routine issues a cycle count alert at Step 619, then branches back to Step 612.

If the answer to Step 608 is yes, the routine checks if the door is no longer in down travel state at Step 610. If the answer is yes, the routine branches to Step 613. If the answer is no, the routine checks if the mode is now being set at Step 611 (DIP switch changes). If the answer is yes, the routine branches to Step 613. If the answer is no, the routine gets the mid-stop value from memory at Step 612.

A separate routine is provide for the user-alert trigger sequence resetting procedure. At Step 620 the routine checks if the operator is in the diagnostic mode and cycles until it is. When in the diagnostic mode, the unit resets the cycle count and alert signal by storing a zero value in memory and turning off the warning light at Step 621.

Open/Close/Stop

Typical open/close/stop controls for commercial door operators are in the form of three button wall control stations. Wall controls for electromechanical door operators switch 24 volts AC to the open and close contactor coils, which in turn energize the motor. These wall control switches must be large enough (in contact design) to switch up to two amps of AC current through the coils.

A prior art controller uses a three button wall control station that switches microelectronic logic levels at 5 volts. In this controller, the microprocessor controls the triacs, which in turn control the motor. The microprocessor, which operates at 5 volts, responds to the inputs from the open/close/stop controls, and then applies the appropriate signal to the triac control circuit. Since it takes only about 500 microamps to switch the open/close/stop controls, wiring advantages are gained over the wiring required to switch 24 volts AC. Due to the lower current requirements and relatively low impedance of the wire when compared to the microprocessor input port impedance, lower gauge wiring can be used, or the same gauge required by the electromechanical openers and greater run distances can be achieved.

As discussed above, many door operator installations are inordinately time consuming because of the need for the operator to travel repeatedly back and forth between the operator and the wall mounted controls. Calibration of the operator for either electromechanical or logic based units, typically involves at a minimum setting up the open, close and auxiliary limits. This calibration takes place at the operator head, activating the unit takes place at the wall. To overcome this deficiency, the controller includes head mounted open, close and stop switches. These switches operate in parallel to the wall mounted switches, but provide added convenience and reduce installation and test time for the service provider. The head mounted switches require small current levels, 500 microamps, and provide only a minimal cost impact on the cost of the operator.

In addition to allowing operation of the unit from the electrical box at the head, the head mounted open/close/stop switches are also used to program various features of the unit. Timer to close, cycle counter, and adjustable mid stop can now be easily programmed at the head unit using these buttons as input devices, without the service provider having to climb up and down the ladder to operate the wall mounted open/close/stop.

Some of the features of the door operator that can be programmed are described below. While some features, such as modes are programmed by setting DIP switches, others are programmed by a combination of DIP switch settings and programmable inputs from the open/close/stop switches and an optional learn switch.

| | DIP Switch Settings | | | |
|---|---|---|---|---|
| Mode | 1 | 2 | 3 | 4 |
| B2 | 1 | 1 | 1 | 1 |
| B2 Failsafe | 1 | 1 | 1 | 0 |
| C2 | 0 | 1 | 1 | 1 |
| C2 Failsafe | 1 | 0 | 0 | 0 |
| D1 | 1 | 0 | 1 | 1 |
| D1 Failsafe | 1 | 0 | 1 | 0 |
| E2 | 0 | 0 | 1 | 1 |
| E2 Failsafe | 0 | 0 | 1 | 0 |
| T | 1 | 1 | 0 | 1 |
| TS | 0 | 1 | 0 | 1 |
| Set Mid Stop | 0 | 1 | 1 | 0 |
| Set Timer to close | 1 | 1 | 0 | 0 |
| FSTS | 0 | 1 | 0 | 0 |
| Memory clear | 0 | 0 | 0 | 1 |
| Diagnostic | 0 | 0 | 0 | 0 |
| Set cycle counter | 1 | 0 | 0 | 1 |

(1 = off, 0 = on)

Setting Modes

Different modes can be set by adjusting the various DIP switches and the learn mode switch. Preferably, the door operator can be operated in the B2, C2, D1, E2, T, and TS operating modes. B2 mode includes momentary contact to open, close and stop, plus wiring for a sensing device to reverse and auxiliary devices to open and close with open override. C2 mode includes momentary contact to open and stop with constant pressure to close, open override plus wiring for sensing device to reverse. D1 mode includes constant pressure to open and close with wiring for sensing device to stop. E2 mode includes momentary contact to open with override and constant pressure to close. Release of the close button will cause the door to reverse plus wiring for sending device to reverse. T mode includes momentary contact to open, close and stop with open override and timer to close. TS mode includes momentary contact to open, close and stop with open override and timer to close.

To set the maximum run timer, the door must be in the closed position, then the DIP switch settings are adjusted. Press the open switch and allow the door to travel to the full open position. The door functions in the C2 mode during maximum run timer setting. Change the DIP switch to the desired operating mode (B2, etc.). The maximum run timer is now set to the door travel time plus ten seconds.

To set the adjustable mid-stop, begin with the door in the closed position. Set the DIP switch to the proper position. Press the open button and allow the door to open uninterrupted to the desired mid stop position. Press the stop switch. Change the DIP switch to the desired operating mode which allows mid stop. To disable mid stop, run the door from the down limit to the up limit without stopping. The mid stop will be disabled and the DIP switch can be placed in the desired operating mode.

To set timer to close, begin with the door in the closed position. Set the DIP switch settings to the desired configuration. In this mode the door will not travel. Pressing the open/close/stop control buttons while in this mode sets the timer to close. The diagnostic light will light every time the electronics receives a valid button closure. The close button will reset the time to close to its factory set minimum time value of 0 seconds. The open button will increase the time to close value by 5 seconds every time it is depressed. Once time is set, change the DIP switch to the desired operating mode.

When the diagnostic mode is selected in the DIP switch, the diagnostic light will flash two times every second and the door will not function while in this mode. If the DIP switch is put in memory clear mode for 30 seconds, the unit will light the diagnostic light and the unit will preset the memory with default values of 90 seconds for maximum run timer, 0 seconds for timer to close, disable mid stop and 0 seconds for cycle counter.

When the DIP switch is in the cycle timer learn mode, the cycle counter warning light will flash the number of tens of thousands of times the unit has cycled followed by a three second pause. For example, if the unit has gone from 10,000 to 19,999 cycles, the light would flash once followed by a three second delay. To program the cycle counter trip point, the following commands are used. Pressing the close button clears the timer to 0. Every push of the open button increases the cycle counter trip point by 10,000 cycles. Once the cycle threshold or trip point is reached the operator will flash the diagnostic light once every two seconds for two seconds until the unit is serviced and the cycle counter is cleared.

Exhibit A is a copy of a source listing for computer software to operate a commercial door operator having the functions described above and including the following modules: switches.srs, main_cdo.srs, main_cdo.inc, interrupt.src and tasker.src.

While there has been illustrated and described a particular embodiment of the present invention, it will be appreciated that numerous changes and modifications will occur to those skilled in the art, and it is intended in the appended claims to cover all those changes and modifications which followed in the true spirit and scope of the present invention.

What is claimed is:

1. A barrier operator, comprising:
   an AC motor having an output shaft, a start coil for creating a temporary starting torque component for the motor and a main coil for driving the motor;
   a transmission connected to the motor to be driven thereby and for connection to a barrier to be moved; and
   a controller external to the motor for starting and stopping the motor, the controller comprising:
   a first relay coupled to the start coil for supplying current having a first polarity to the start coil;
   a second relay coupled to the start coil for supplying current having a second polarity to the start coil;
   a current controller coupled to the main coil for supplying current to the main coil; and
   a decoupler arrangement including an speed sensor external to the motor for sensing output speed of the motor, and a decoupler responsive to the speed sensor means for decoupling the start coil when an output speed of the motor achieves a predetermined percentage of a maximum rated output speed.

2. A barrier operator according to claim 1 wherein the decoupler comprises an electrically operated switch.

3. A barrier operator according to claim 1 wherein the decoupler comprises a speed sensor that does not directly contact the output shaft for sensing an output speed of the motor.

4. A barrier operator according to claim 3 further comprising a limit shaft for setting open limit and closed limit positions of the door, wherein the limit shaft rotates at a predetermined percentage of an output speed of the motor and wherein the decoupler comprises a speed sensor for detecting rotation of the limit shaft.

5. A barrier operator according to claim 4 wherein the speed sensor comprises an interrupter cup and a photointerrupter module.

6. The operator of claim 1 further comprising a cycle counter for counting the number of open and close movements of the door.

7. The operator of claim 6 further comprising a memory for storing a predetermined number.

8. The operator of claim 7 further comprising an indicator light for indicating when the number of movements of the door counted by the cycle counter reaches the predetermined number.

9. The operator of claim 8 further comprising a learn routine for learning the predetermined number of cycles and for storing the number in the memory.

10. The operator of claim 4 further comprising a learn routine for learning a rotational speed of the limit shaft for learning the maximum rated output speed of the motor.

11. A barrier position controller for controlling a motor and other functions in a barrier operator, the motor having an output shaft, a start coil for changing the polarity of the motor and a main coil for driving the motor, the barrier position controller external to the motor and comprising:
a first relay coupled to the start coil for supplying current having a first polarity to the start coil;
a second relay coupled to the start coil for supplying current having a second polarity to the start coil;
a current controller coupled to the main coil for supplying current to the main coil; and
a decoupler arrangement including a speed sensor external to the motor for sensing output speed of the motor, and a decoupler responsive to the speed sensor for decoupling the start coil when an output speed of the motor achieves a predetermined percentage of a maximum rated output speed.

12. A barrier position controller according to claim 11 wherein the decoupler comprises a switch and a microprocessor responsive to an output of a speed sensor sensing a rotational speed of the motor.

13. A barrier position controller according to claim 11 further comprising a limit shaft for setting an open limit position and a closed limit position of a door, wherein the limit shaft rotates at a predetermined percentage of an output speed of the motor and wherein the decoupler arrangement comprises a switch and a microprocessor responsive to an output of the speed sensor.

14. A barrier position controller according to claim 13 wherein the speed sensor comprises an interrupter cup and a photointerrupter module.

15. A barrier position controller according to claim 11 further comprising a cycle counter for counting the number of open and close movements of the door.

16. A barrier position controller according to claim 15 further comprising a memory for storing a predetermined number of cycles.

17. A barrier position controller according to claim 16 further comprising an indicator light for indicating when the number of movements of a door counted by the cycle counter reaches the predetermined number.

18. A barrier position controller according to claim 17 further comprising a learn routine for learning the predetermined number of cycles and for storing the number in the memory.

19. A barrier position controller according to claim 13 further comprising a learn routine for learning the rotational output speed of the limit shaft when coupled to the motor and for learning the maximum rated output speed of the motor.

20. A controller for controlling a motor and other functions in a commercial door operator, the motor having an output shaft, a start coil for changing the polarity of the motor and a main coil for driving the motor, comprising:
a speed sensor external to the motor for sensing a rotational speed of the motor;
a processor, responsive to an output of the speed sensor; and
a motor start circuit comprising:
a first relay coupled to the start coil for supplying current having a first polarity to the start coil;
a second relay coupled to the start coil for supplying current having a second polarity to the start coil;
a current controller coupled to the main coil for supplying current to the main coil; and
a switch, responsive to the processor, for decoupling the start coil when an output speed of the motor achieves a predetermined percentage of a maximum rated output speed.

21. A controller according to claim 20 further comprising a limit shaft for setting open limit and closed limit positions of the door, wherein the limit shaft rotates at a predetermined percentage of an output speed of the motor and wherein the speed sensor senses a rotational speed of the limit shaft.

22. A controller according to claim 20 further comprising a cycle counter for counting the number of open and close movements of the door.

23. A controller according to claim 22 further comprising a memory for storing a predetermined number of cycles.

24. A controller according to claim 23 further comprising an indicator light for indicating when the number of movements of the door counted by the cycle counter reaches the predetermined number.

25. A controller according to claim 20 further comprising a plurality of switches for providing open, close and stop functions at the controller and for providing programming inputs to the processor.

26. A controller according to claim 25 further comprising a learn routine, responsive to user inputs to the plurality of switches, for learning the predetermined number of cycles and for storing the cycle number in the memory.

27. A controller according to claim 25 further comprising a learn routine, responsive to user inputs to the plurality of switches, for learning a rotational speed of the limit shaft when coupled to the motor and for learning the maximum rated output speed of the motor.

28. A logic control device for controlling a motor and other functions in a barrier operator, the motor having an output shaft, and first, second and third coils, comprising:
a speed sensor external to the motor for sensing a rotational speed of the motor;
a first relay responsive to the speed sensor and coupled to the first and second coils for supplying and decoupling current having a first polarity;
a second relay responsive to the speed sensor and coupled to the first and second coils for supplying and decoupling current having a second polarity; and
a current controller coupled to the third coil for supplying current to the third coil.

29. The logic control device of claim 28 further comprising a cycle counter for counting the number of open and close movements of the door.

30. The logic control device of claim 29 further comprising a memory for storing a predetermined number of cycles.

31. The logic control device of claim 30 further comprising an indicator light for indicating when the number of movements of the door counted by the cycle counter reaches the predetermined number.

32. The logic control device of claim 31 further comprising a learn routine for learning the predetermined number of cycles and for storing the number in the memory.

33. A controller for controlling a commercial door operator, comprising:
- a motor control for controlling a motor for moving the door;
- a speed sensor external to the motor for sensing a rotational speed of the motor;
- a decoupler arrangement responsive to the speed sensor external to the motor for sensing output speed of the motor and decoupling a start coil of the motor when an output speed of the motor achieves a predetermined percentage of a maximum rated output speed;
- a cycle counter for counting the number of open and close movements of the barrier;
- a memory for storing a predetermined number of cycles and the number of open and close movements counted by the cycle counter; and
- an indicator for indicating when the number of movements of the door counted by the cycle counter reaches the predetermined number.

34. The controller of claim 33 wherein the indicator comprises a warning light.

35. The controller of claim 33 wherein the controller further comprises a display for displaying the number of cycles counted in the cycle counter and stored in memory.

36. The controller of claim 33 further comprising a datalink for downloading the data stored in the memory effective for remotely displaying and storing the number of cycles counted and the predetermined number.

37. A controller according to claim 33 further comprising a microprocessor and a plurality of switches for providing open, close and stop functions at the logic control device and for providing programming inputs to the digital circuit.

38. A controller according to claim 34 further comprising a learn routine, responsive to user inputs to the plurality of switches, for learning the predetermined number of cycles and for storing the number in the memory.

39. A controller for controlling a door operator including located at the door operator, comprising:
- a motor control for controlling a motor for moving the door;
- a speed sensor external to the motor for sensing a rotational speed of the motor; a decoupler for decoupling a start coil of the motor when an output speed of the motor achieves a predetermined percentage of a maximum rated output speed,
- a digital circuit for processing open, close, and stop functions of the door operator;
- a memory storing instructions for operating the door operator and data values pertaining to operation of the door operator; and
- a plurality of logic controlled switches for providing open, close and stop functions at the controller and for providing programming inputs to the digital circuit effective for enabling a user to service, maintain and test the door operator at the door operator.

40. A controller for controlling rotation of a motor of a barrier position controller, the motor having a start coil for changing the direction of rotation of the motor and a main coil for driving the motor, comprising:
- a speed sensor external to the motor for sensing a rotational speed of the motor;
- a first start coil current controller coupled to the start coil for supplying current having a first polarity to the start coil;
- a second start coil current controller coupled to the start coil for supplying current having a second polarity to the start coil;
- a main coil current controller coupled to the main coil for supplying current to the main coil; and
- a processor for decoupling current supplied to the start coil by the first or the second start coil current controller when the rotational speed of the motor sensed by the speed sensor achieves a predetermined value.

41. A method for controlling the rotation of a motor having a start coil and a main coil in a first or a second direction to move a barrier in a respective first or second direction, the method comprising:
- coupling a supply current to the main coil;
- supplying current of a first polarity to the start coil to promote rotation in the first direction;
- supplying current of a second polarity to the start coil to promote rotation in the second direction;
- sensing the rotational speed of the motor external to the motor; and
- decoupling the supply of current of the first or second direction from the start coil when the rotational speed of the motor sensed in the sensing step achieves a predetermined value.

42. A barrier operator according to claim 1, wherein said current controller comprises a solid state switch.

43. A barrier operator according to claim 42, wherein said solid state switch comprises a triac.

44. A barrier operator according to claim 11, wherein said current controller comprises a solid state switch.

45. A barrier operator according to claim 44, wherein said solid state switch comprises a triac.

46. A barrier operator according to claim 20, wherein said current controller comprises a solid state switch.

47. A barrier operator according to claim 46, wherein said solid state switch comprises a triac.

48. A barrier operator according to claim 28, wherein said current controller comprises a solid state switch.

49. A barrier operator according to claim 48, wherein said solid state switch comprises a triac.

* * * * *